(12) United States Patent
ElArabawy et al.

(10) Patent No.: US 10,512,068 B2
(45) Date of Patent: Dec. 17, 2019

(54) METHOD AND DEVICE FOR HIERARCHICAL MODULATION OF DATA STREAMS

(71) Applicant: Taiwan Semiconductor Manufacturing Co., Ltd., Hsinchu (TW)

(72) Inventors: Ahmed ElArabawy, San Diego, CA (US); David Gell, San Diego, CA (US); Kenneth L. Stanwood, Vista, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 67 days.

(21) Appl. No.: 15/671,153

(22) Filed: Aug. 8, 2017

(65) Prior Publication Data

US 2017/0339691 A1    Nov. 23, 2017

Related U.S. Application Data

(62) Division of application No. 14/503,295, filed on Sep. 30, 2014, now Pat. No. 9,749,999.

(60) Provisional application No. 61/905,784, filed on Nov. 18, 2013.

(51) Int. Cl.
*H04W 72/04* (2009.01)
*H04L 5/00* (2006.01)
*H04L 27/34* (2006.01)

(52) U.S. Cl.
CPC ....... *H04W 72/0413* (2013.01); *H04L 5/0037* (2013.01); *H04L 5/0057* (2013.01); *H04L 27/3488* (2013.01); *H04W 72/042* (2013.01); *H04L 5/0058* (2013.01)

(58) Field of Classification Search
CPC ............ H04L 5/0057; H04L 27/3488; H04W 72/0413; H04W 72/042
See application file for complete search history.

(56) References Cited

U.S. PATENT DOCUMENTS

| | | | |
|---|---|---|---|
| 8,559,371 B2* | 10/2013 | Wu | H04L 5/02 370/328 |
| 2007/0270170 A1* | 11/2007 | Yoon | H04L 27/3488 455/509 |
| 2009/0052394 A1* | 2/2009 | Kalhan | H04B 1/16 370/331 |
| 2011/0103498 A1* | 5/2011 | Chen | H04L 1/06 375/260 |

(Continued)

*Primary Examiner* — Redentor Pasia
(74) *Attorney, Agent, or Firm* — JCIPRNET

(57) ABSTRACT

This disclosure relates to a method and a device for implementing hierarchical modulation of data streams. According to one of the exemplary embodiments, disclosure is directed to a method for hierarchical modulation of two data streams transmitted from a user device in a communication network. The method would include not limited to: sending, via a transceiver in the user device, a request for uplink bandwidth to an access node in the communication network; receiving, via the transceiver, an uplink bandwidth allocation provided in a downlink channel from the access node; multiplexing, at the user device, a base layer data stream and an enhanced layer data stream into a single multiplexed data stream; and transmitting, via the transceiver, the single multiplexed data stream to the access node in the uplink bandwidth allocation.

10 Claims, 23 Drawing Sheets

(56) References Cited

U.S. PATENT DOCUMENTS

2011/0250918 A1\* 10/2011 Jen ..................... H04W 52/08
                                                   455/509
2012/0144433 A1\* 6/2012 Won ............... H04N 21/234327
                                                    725/62

\* cited by examiner

METHOD AND DEVICE FOR HIERARCHICAL MODULATION OF DATA STREAMS

CROSS-REFERENCE TO RELATED APPLICATION

This application is a divisional application of and claims the priority benefit of a prior application Ser. No. 14/503,295, filed on Sep. 30, 2014, now allowed. The prior application Ser. No. 14/503,295 claims the priority benefit of U.S. provisional application Ser. No. 61/905,784, filed on Nov. 18, 2013. The entirety of each of the above-mentioned patent applications is hereby incorporated by reference herein and made a part of this specification.

BACKGROUND OF THE DISCLOSURE

1. Technical Field

This disclosure relates to a method and a device for implementing hierarchical modulation of data streams.

2. Description of Related Art

Hierarchical modulation, also called layered modulation, is a signal processing technique for multiplexing and modulating multiple data streams into one single symbol stream. The idea is that one stream (i.e., the base-layer, also called the High Priority stream, HP) is modulated with a robust modulation technique and one or more other streams (i.e., enhancement-layers, also called Low Priority streams, LP) are synchronously superimposed on the base layer with a less robust modulation. When hierarchical modulation signals are transmitted, user devices with good reception and with hierarchical modulation enabled receivers can demodulate the base and enhancement layers, while user devices with poor reception or conventional receivers can demodulate only the base layer (the HP stream). Hierarchical modulation has been used in, among other things, video broadcasting such as digital video broadcasting—terrestrial (DVB-T), digital video broadcasting—handheld (DVB-H), and MediaFLO by Qualcomm Incorporated, the implementation of which are readily apparent to one of ordinary skill in the art.

FIG. 1 illustrates a conventional video broadcasting hierarchical modulation system 100. Broadcasting refers to the transmission of a message to all receivers (e.g., every device on the network) simultaneously. Here, the base layer is associated with a video base layer that is needed for all receivers (e.g., user equipment UE1 120 and UE2 130, although any number of UEs may be implemented), which is sent from a base station 110 with high robustness to guarantee proper decoding by all receivers even with poor channel quality. Enhanced layers, which only contribute to the quality of the received video, are sent with less robust techniques. Hence, receiving devices with good channel conditions, e.g., UE1, can receive the full video signal, while those devices with poor channel conditions at the edge of a cell, e.g., UE2, will only manage to get the base layer. A UE may also be referred to as a user device herein.

FIG. 2A illustrates a constellation diagram of a basic implementation of hierarchical modulation. Here, the base layer is viewed as quadrature phase shift keying (QPSK also referred to as quadrature amplitude modulation QAM4) (shown left) with two bits per symbol data carrying capacity, while the enhanced layer is provided by the additional two bits per symbol data carrying capacity (4 bits per symbol total) of quadrature amplitude modulation QAM16 (shown right with base layer bits and enhanced layer bits separated by the "|" character for clarity). Receiving the base layer includes only determining which quadrant the symbol resides in, and can be performed by demodulating the received signal as if it were transmitted as QPSK. Receiving the enhanced layer includes demodulating the received signal as QAM16 to determine the position within the quadrant to resolve the additional two bits of data carrying capacity.

FIG. 2B shows an example of hierarchical modulation in which the base layer and enhanced layer are mapped into QAM64, which logically appears to be a QAM16 (represented by the 16 square constellation points in each quadrant) constellation with 4 bits per symbol data carrying capacity on top of a QPSK (represented by the gray circles) constellation with 2 bits per symbol data carrying capacity realized by a single transmission of a QAM64 constellation with 6 bits per symbol data carrying capacity. In this case, to receive the enhanced layer it might be useful to receive the signal as QAM64, but to receive the base layer it is only useful to receive the signal as QPSK. One skilled in the art would understand that different variants, such as receiving the base layer as QAM16 and the enhanced layer as the remaining 2 bits per symbol carrying capacity of a QAM64 constellation, are possible.

While traditional hierarchical modulation has been used in broadcasting, it has not been used in non-broadcasting communications system such as, but not limited to unicast transmission. Unicast transmission refers to the sending of messages to a single network destination. It would be helpful to find a way to use hierarchical modulation in a non-broadcast communications system to better utilize bandwidth capacity.

SUMMARY OF THE DISCLOSURE

Accordingly, this disclosure relates to a method and a device for implementing hierarchical modulation of data streams.

In an aspect, this disclosure relates to a method for hierarchical modulation of two data streams transmitted from a user device in a communication network, the method includes sending, via a transceiver in the user device, a request for uplink bandwidth to an access node in the communication network; receiving, via the transceiver, an uplink bandwidth allocation provided in a downlink channel from the access node; multiplexing, at the user device, a base layer data stream and an enhanced layer data stream into a single multiplexed data stream; and transmitting, via the transceiver, the single multiplexed data stream to the access node in the uplink bandwidth allocation.

In an aspect, this disclosure relates to a method for receiving, at an access node in a communication network, a single multiplexed hierarchical modulation data stream transmitted from a user device, the method includes: receiving, via a transceiver in the access node, a request for uplink bandwidth from the user device; sending, via a transceiver, an uplink bandwidth allocation in a downlink channel to the user device; sending, via a transceiver, an uplink bandwidth allocation in a downlink channel to the user device; receiving the single multiplexed hierarchical modulation data stream from the user device in the uplink bandwidth allocation, wherein the single multiplexed hierarchical modulation data stream comprises a base layer data stream and an enhanced layer data stream; and extracting the base layer data stream and the enhanced layer data stream from the multiplexed hierarchical modulation data stream.

In another aspect, this disclosure relates to a user equipment (UE) which includes a transceiver; and a processor coupled to the transceiver and configured at least for: sending, via the transceiver in the user device, a request for uplink bandwidth to an access node in the communication network; receiving, via the transceiver, an uplink bandwidth allocation provided in a downlink channel from the access node; multiplexing, a base layer data stream and an enhanced layer data stream into a single multiplexed data stream; and transmitting, via the transceiver, the single multiplexed data stream to the access node in the uplink bandwidth allocation.

The foregoing, and other features and advantages of the disclosure, will be apparent from the following, more particular description of the preferred embodiments of the disclosure, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

DETAILED DESCRIPTION OF DISCLOSED EMBODIMENTS

Figure 1:
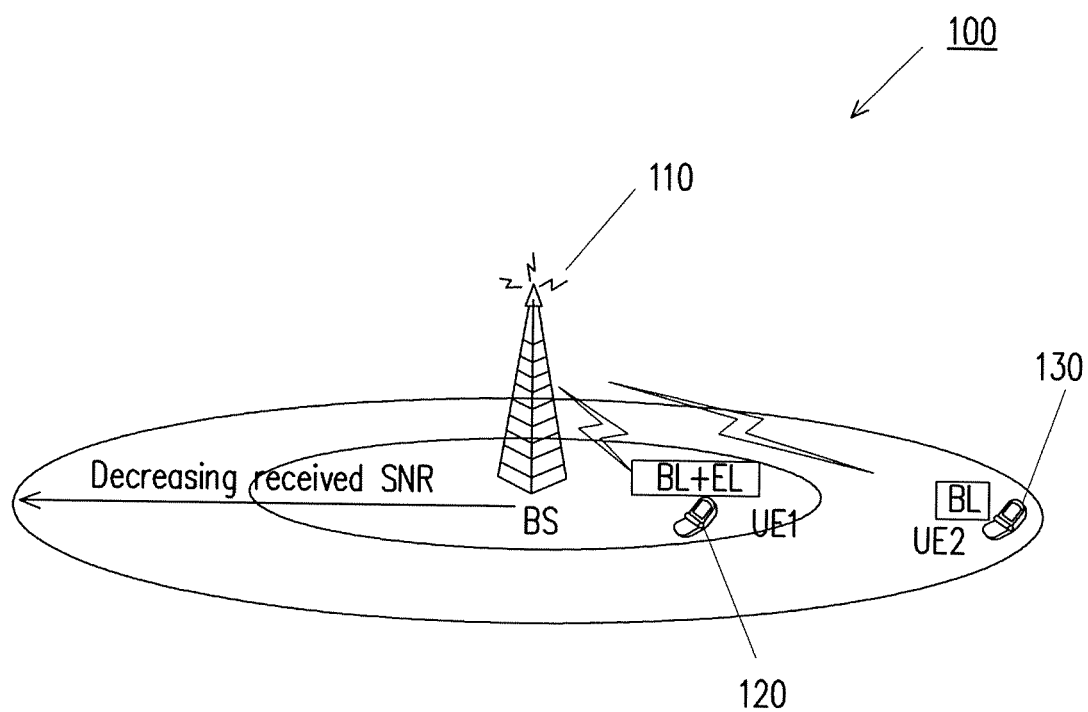
FIG. 1 illustrates hierarchical modulation in a conventional video broadcasting system.

Aspects of the present disclosure and their advantages may be understood by referring to FIGS. 3-22, wherein like reference numerals refer to like elements. The descriptions and features disclosed herein can be applied to various communication systems, including wireline and wireless networks. For example, the embodiments disclosed herein can be used with cellular 2G, 3G, 4G (including Long Term Evolution (LTE), LTE Advanced, and IEEE 802.16 wireless-network standards referred to as "WiMAX"), cellular backhaul, IEEE 802.11 wireless local access network standards ("Wi-Fi"), Ultra Mobile Broadband (UMB), cable modem, and other point-to-point or point-to-multipoint wireline or wireless technologies. For concise exposition, various aspects are described using terminology and organization of particular technologies and standards. However, the features described herein are broadly applicable to other technologies and standards.

Figure 2A:
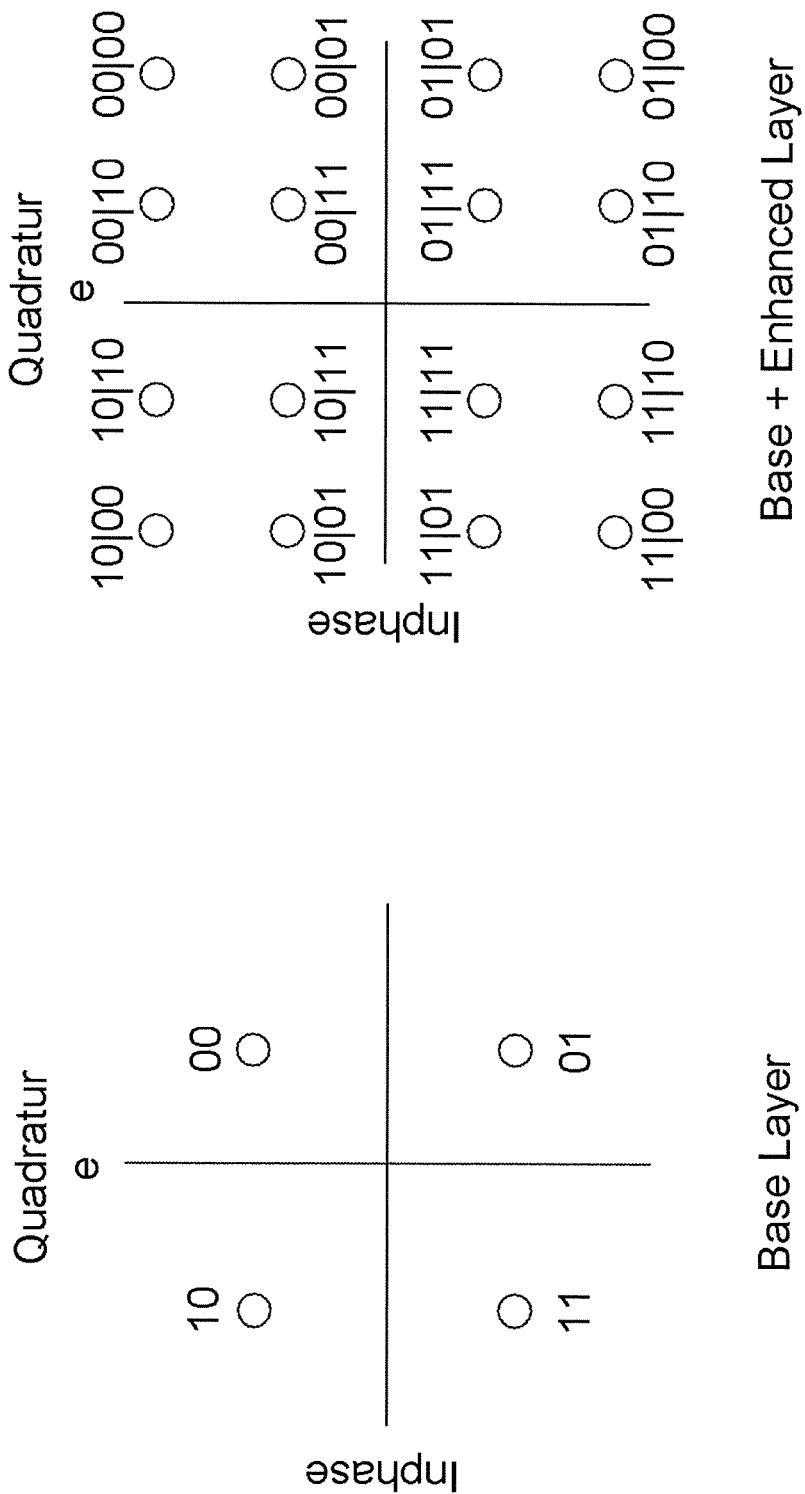
FIG. 2A illustrates a constellation diagram of an implementation of hierarchical modulation using QAM4 and QAM16.
Figure 2B:
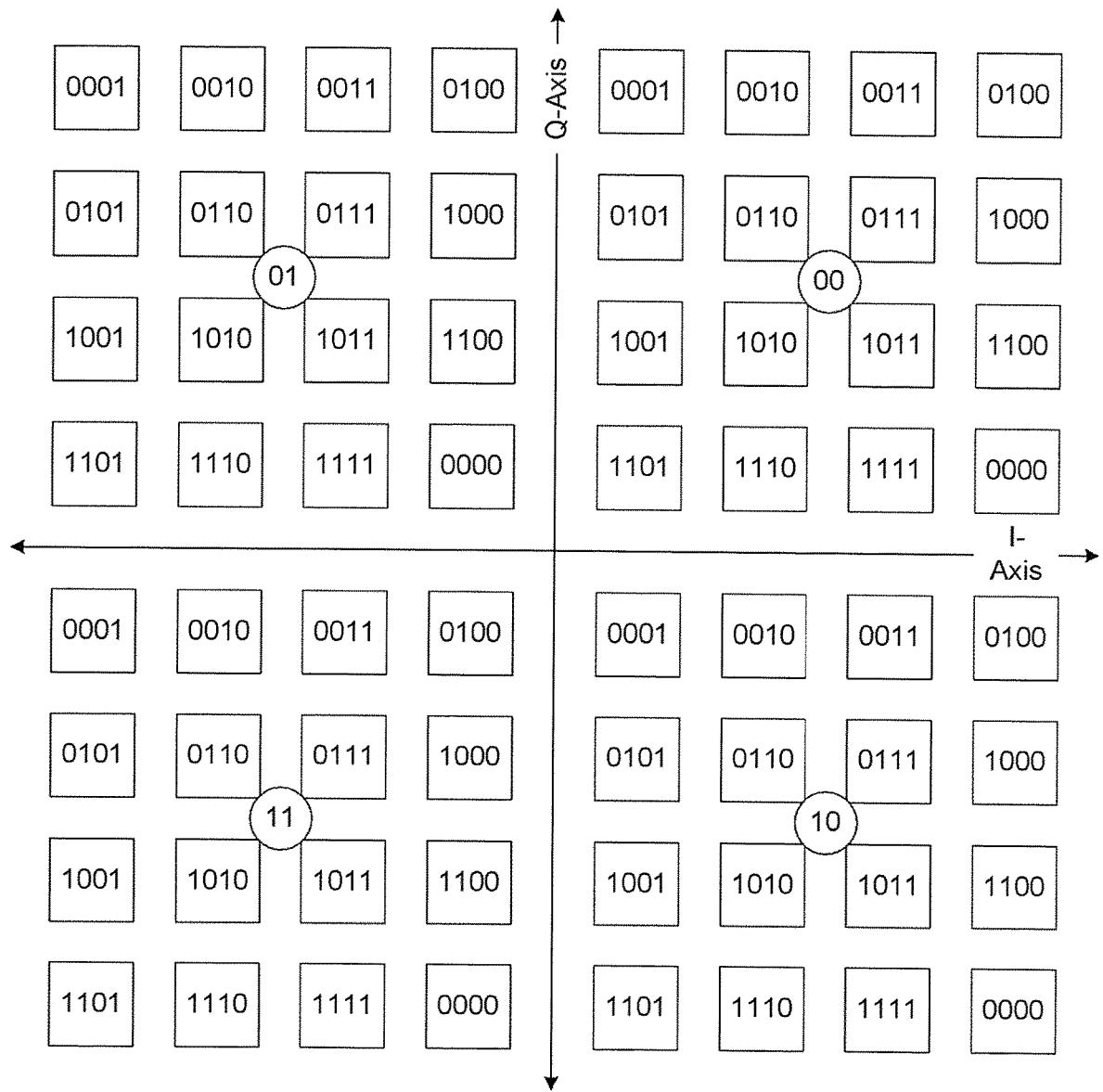
FIG. 2B illustrates a constellation diagram of an implementation of hierarchical modulation using QAM4 and QAM64.

The following convention is oriented towards a reception scheme in a mobile device, i.e., a user equipment (UE), for describing multiplexed streams in hierarchical modulation. As used herein, the term "UE" may also refer to a terminal node, a mobile device, a subscriber station, a mobile phone, a cellular phone, or other user operated communication device. As an example, in a hierarchical modulation system utilizing QPSK modulation on the base layer and a higher order modulation to enable the enhanced layer, one of the UEs will aim to receive only the base layer using QPSK reception. Another UE will aim to receive the full signal using higher order modulation (e.g. QAM64 to give an additional 4 bits per symbol data carrying capacity) reception. That is, the 2 bits per symbol base layer and the 4 bits per symbol enhanced layer are mapped into a QAM64 modulated, over the air signal (transmitted and received) as illustrated in FIG. 2B.

The use of link adaptation in the downlink for unicast traffic causes a base station (e.g., evolved NodeB or eNB in case of LTE) to adjust the modulation/coding in the transmission based on the channel quality for the UE. As used herein, the term "base station" may also refer to an access node, an evolved NodeB or eNB in case of LTE, or other transmitting network node. A UE with poor channel quality is assigned QPSK modulation in the radio resources that are allocated to it. Additional bits are "piggy backed" on these radio resources to other UEs with better channel quality using hierarchical modulation. This means, for the radio resources carrying unicast traffic via more robust modulation schemes in the downlink, another stream can be superimposed targeting another UE. This leads to enhanced overall throughput of the communications system. The improvement in the throughput may come at the expense of reduced signal to noise ratio (SNR) for the base layer. However, to make the aggregate effect more favorable, the present disclosure can be applied on UEs that have been determined to be able to currently tolerate such reduction in the SNR or can tolerate further increase in the bit error rate (BER). The structure of the control channel information (e.g., downlink control information or DCIs in case of LTE) describing the downlink allocation to UEs is changed to allow multiple allocations of the same radio resource to multiple UEs. This technique improves utilization of radio resources, which will lead to improvement in system throughput. Moreover, UEs can share a radio resource to receive short messages not requiring full utilization of the smallest allowable radio resource (e.g., a single LTE resource block). For example, one UE that does not need the entire radio resource, say at QAM16, receives messages at the equivalent of QAM4 (by processing only 2 of the 4 bits per symbol), while another UE receives messages at QAM16 (by processing all 4 bits per symbol). This can be used in, for example, machine to machine (M2M) technologies such as, but not limited to, short, messages sent to a machine requesting a change in behavior or sending acknowledgment (ACK) messages to information previously sent by the machine on the uplink.

Figure 3:
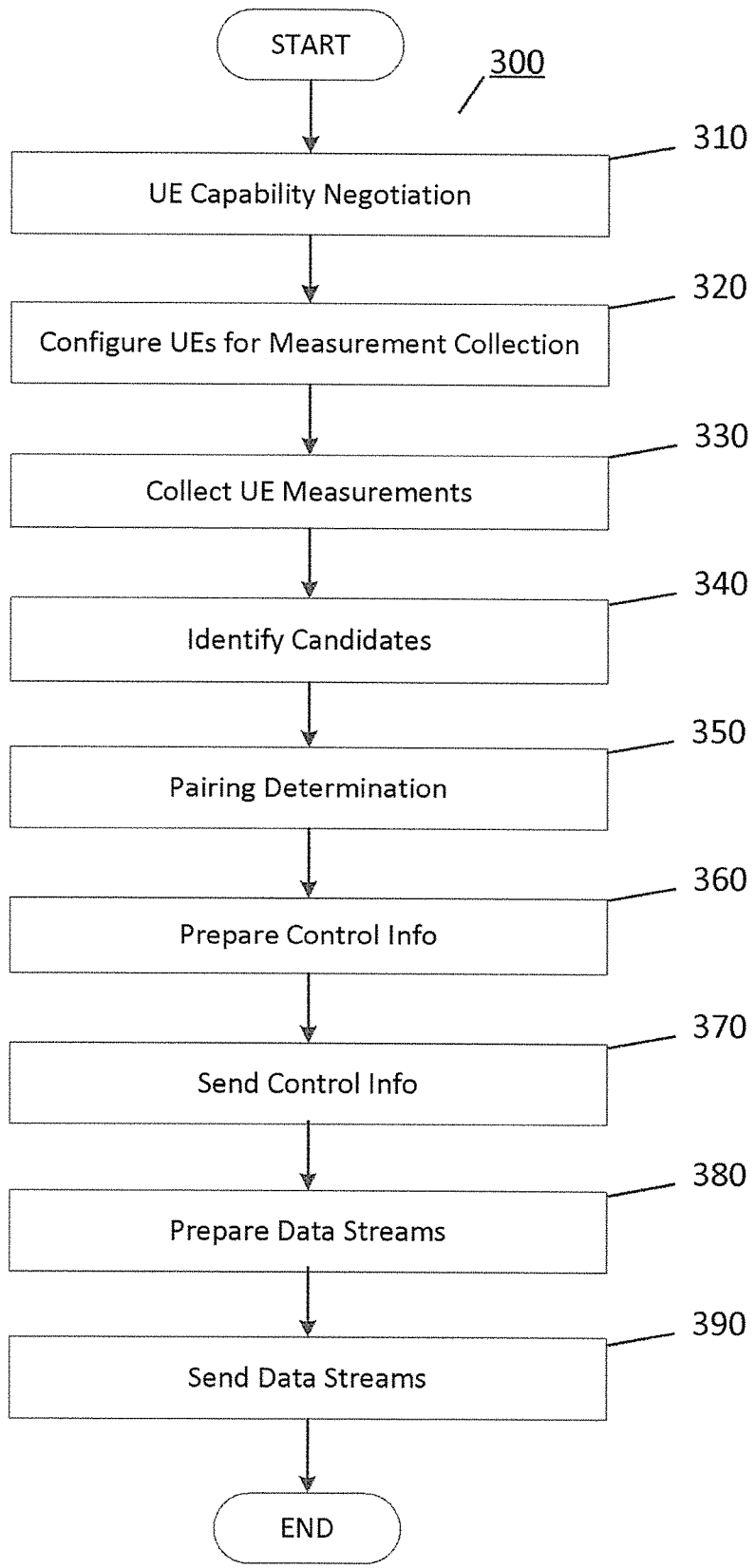
FIG. 3 illustrates a unicast downlink hierarchical modulation process according to an embodiment of the disclosure.

FIG. 3 illustrates a unicast downlink hierarchical modulation process 300 according to an embodiment of the disclosure. Process 300 begins by the base station receiving (step 310) the capabilities of the UEs. Capabilities include, but are not limited to whether hierarchical modulation and/or detailed measurement reports are supported by the respective UE. As part of those capabilities, the base station may also identify levels of features related to hierarchical modulation supported by the respective UE. The base station uses this information in identifying a UE as a candidate for shared allocation using hierarchical modulation. This step is optional in a system that has all UEs to support a hierarchical modulation scheme.

The UEs are then configured (step 320) for measurement collection. Here, the UEs are configured to provide the base station with a detailed measurement report, which may include measurements of different downlink signal properties ("signal measurements") and one or more recommended modulation schemes. This step is optional in a system in which all UEs provide a standard report that includes sufficient information to support the hierarchical modulation scheme. For communication systems in which the UEs report the downlink channel quality in terms of raw information such as, for example, SINR (i.e., the power of a certain signal of interest divided by the sum of the interference power and the power of some background noise) or received signal strength indication (RSSI), no change may be needed to the reporting format. However, some changes may be applied to precision, thresholds, or periodicity of reporting. For a communication systems (such as LTE) in which the UE processes this raw information to determine a recommended modulation/coding scheme, a detailed measurement report may be utilized. In the latter case, the recommended modulation scheme is determined by analyzing the reception margin above a predetermined minimum signal quality needed to support the recommended modulation. For instance, if an SNR of N is useful to receive the recommended modulation and the UE has an SNR of N+Y, then Y is the reception margin. Such information indicates whether the receiver is able to tolerate some degradation of SINR while maintaining the recommended modulation.

In an embodiment of the disclosure, the base station identifies the UEs that support detailed measurement reports for hierarchical modulation, and sends a configuration message to those UEs (or a subset of them) to send such detailed measurement reports. On the UE side, upon receiving a configuration message, the UE will set its configuration to send detailed measurement reports to the base station. In an embodiment of the disclosure, the configuration message includes raw or more precise SINR and/or RSSI, reception margin above the recommended modulation, or list of tolerable hierarchical modulation combinations. Alternatively, the UE has already informed the base station whether or not it supports hierarchical modulation or detailed measurement reports.

The signal measurements and reports from the UEs are then collected (step 330) by the base station. Some of these reports may be the standard report while others may be detailed measurement reports. For a UE that supports hierarchical modulation and is configured to send a detailed measurement report, the UE prepares and sends a measurement reporting message with the UE's recommendation for the selected modulation in a periodic or aperiodic/event driven fashion. The detailed measurement report may include further information to give more detailed precision about the recommended modulation/coding. For example, a detailed measurement report may include an information element in addition to the recommended modulation/coding to specify the UE tolerance to a further degradation in the SINR due to superimposing of another layer via hierarchical modulation (HM). This measure of tolerance can be stated via a simple flag (allow, disallow), via a quantitative value such as a value of 1 to 4, or via specifying what modulation scheme the UE will allow to be superimposed on its signal, such as a UE that is recommending a QPSK modulation for reception of its data and a QAM16 modulation to be further superimposed on its signal. The UE may specify the options (does not allow HM, allow QAM16 only, allow QAM64) using one or more bit fields in a message. In another embodiment of the disclosure, the detailed measurement report includes a definition of a modulation/coding encoding to communicate the same type of information. This means the message format may remain the same, but the modulation/coding schemes may be extended to support the more precise reporting. In another embodiment of the disclosure, the detailed measurement report provides the raw data (SINR, . . . ) in addition to or instead of the recommendation.

Figure 4:
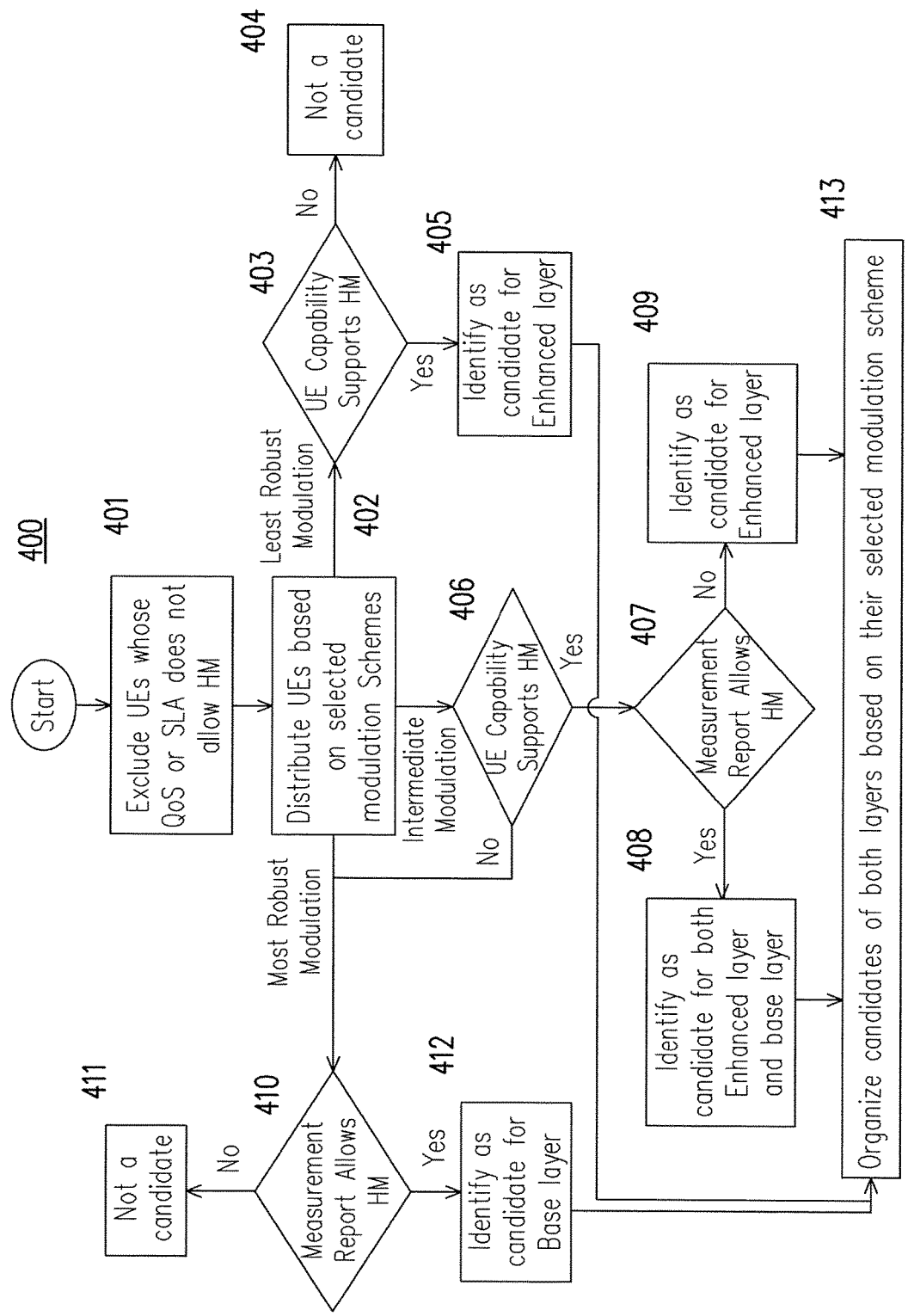
FIG. 4 illustrates a process for selecting UE candidates for reception of both the basic and enhanced layer according to an embodiment of the disclosure.

In the next step, the base station identifies (step 340) candidate UEs for application of hierarchical modulation. FIG. 4 illustrates a process 400 for selecting UE candidates for reception of the basic layer and/or enhanced layer according to an embodiment of the disclosure. In the process 400, each UE candidate is a UE that has data pending at the base station for transmission to the UE. UEs are excluded (step 401) and considered as noncandidates whose service level agreements (SLAs) or quality of service (QoS) profiles do not allow participating in hierarchical modulation. Note that this will mean that QoS and/or service level agreement (SLA) may have some indicators for whether or not hierarchical modulation is acceptable for this UE or bearer, i.e., set of network parameters. Such indicators may be optional in systems in which all UEs are considered to be candidates for hierarchical modulation regardless of QoS or SLA. The remaining UE candidates are then distributed (step 402) based on the UEs' selected modulation schemes as follows.

A communications system implements a finite set of modulation techniques among its nodes. For example, QPSK, QAM16, and QAM64 may be implemented. Within this example set of modulation techniques, QPSK is considered the most robust technique and QAM64 is considered the least robust technique. No matter what types of modulation techniques are employed as a set within a communications system, one modulation can be considered the most robust and another one the least robust within the set. A modulation scheme is more robust if it can tolerate more noise, interference, etc. and still be received as compared to another modulation scheme.

For UEs operating at the most robust modulation scheme, e.g., QPSK, the measurement report for each UE is checked (step 410) to see if hierarchical modulation is currently allowed given the signal quality reported. The measurement report indicates, or may be used to determine, that the UE has reception margin, i.e., the UE can tolerate some signal degradation due to adding an enhanced layer. In other words, the UE is physically capable of receiving a signal comprised of both the base and enhanced layers and demodulating the base layer (e.g., quadrant) in the presence of signal quality degradation caused by the enhanced layer. If a particular UE's reported signal quality does not allow hierarchical modulation, the UE is excluded (step 411) as a candidate. If the reported signal quality allows hierarchical modulation, the UE is identified (step 412) as a candidate for the base layer.

UEs with the least robust modulation scheme, e.g., QAM64, may be considered as candidates for the enhanced layer. Within this group, each UE is checked (step 403) to see if the respective UE is capable of supporting hierarchical modulation, i.e., whether the UE is capable of demultiplexing the data represented by the enhanced layer from the combined bitstream representing the base and enhanced layers. If a particular UE is not capable of supporting hierarchical modulation, the UE is excluded (step 404) as a candidate. If the UE supports hierarchical modulation, the UE is identified (step 405) as a candidate for the enhanced layer. In another embodiment of the disclosure, two UEs both using the least robust (highest order) modulation could be paired with one downgraded to a lower modulation if the data situation made sense, e.g., insufficient data to fully utilize the resources at the higher modulation.

All other UEs (i.e., those UEs running with other modulation schemes not considered to be most or least robust, e.g., QAM16) are considered as candidates for both the base and enhanced layers. Within this respective group, each UE is checked (step 406) to see if the respective UE is capable of supporting hierarchical modulation. If a particular UE is not capable of supporting hierarchical modulation, the UE is identified as a candidate for the base layer and follows step 410. If the UE is capable of supporting hierarchical modulation, the respective measurement report is checked (step 407) to see if hierarchical modulation is allowed by the current signal quality. If a particular UE's reported signal quality does not allow hierarchical modulation with the UE receiving the base layer degraded by an enhanced layer, the UE is identified (step 409) as a candidate for the enhanced layer. If the reported signal quality allows hierarchical modulation with the UE receiving the base layer, the UE is identified (step 408) as a candidate for both the base layer and enhanced layer. Accordingly, such UEs may be added to both lists of candidates—base layer and enhanced layer.

After the classification process is complete, the candidate UEs of both layers may be organized (step 413) based on the selected modulation scheme.

The following table shows an exemplary communications system with ten (10) UEs, which are labeled as UE_1 to UE_10. The table shows some relevant features of each UE, including their selected modulation, whether their capabilities support hierarchical modulation, whether their QoS or SLA supports hierarchical modulation, and whether they have headroom margin in their measurement report. This example assumes that the communication system supports only QPSK, QAM16, and the QAM64 modulation schemes. For other systems using other modulation schemes, the table can be modified accordingly.

| UE ID | Capabilities Support HM? | Qos/SLA Support HM? | Modulation | HM Headroom? |
|---|---|---|---|---|
| UE_1 | Yes | Yes | QPSK | Yes |
| UE_2 | Yes | Yes | QPSK | No |
| UE_3 | No | Yes | QAM64 | Yes |
| UE_4 | Yes | Yes | QAM16 | Yes |
| UE_5 | Yes | No | QPSK | Yes |
| UE_6 | No | No | QAM64 | No |
| UE_7 | No | Yes | QAM16 | Yes |
| UE_8 | Yes | Yes | QAM16 | No |
| UE_9 | Yes | Yes | QAM64 | Yes |
| UE_10 | No | Yes | QAM16 | Yes |

The following table shows the outcome of the candidate selection procedure for the exemplary communications system shown above. Here, UE1 is a candidate for the receiving base layer via QPSK modulation. UE_4, UE_7, and UE_10 are candidates for receiving the base layer via QAM16 modulation. UE_4 and UE_8 are candidates for receiving the enhanced layer via QAM16 modulation. UE_9 is a candidate for receiving the enhance layer via QAM64 modulation. UE_4 is the only UE capable of receiving both the base layer and the enhanced layer. Other UEs in the above table are not candidates for hierarchical modulation for various reasons, such as not being able to support hierarchical modulation, being associated with a QoS/SLA that does not support hierarchical modulation, or not having headroom to support hierarchical modulation. For example, UE_2 is not a candidate for hierarchical modulation because it does not have sufficient headroom, UE_3 is not a candidate for hierarchical modulation because it does not have the capabilities to support hierarchical modulation, UE_5 is not a candidate for hierarchical modulation because it is associated with a QoS/SLA that does not support hierarchical modulation, and UE_6 is not a candidate for hierarchical modulation because none of its attributes (capabilities, QoS/SLA, headroom) support hierarchical modulation.

| Candidates for Base Layer | | Candidates for Enhanced Layer | |
|---|---|---|---|
| QPSK | QAM16 | QAM16 | QAM64 |
| UE_1 | UE_4, UE_7, UE_10 | UE_4, UE_8 | UE_9 |

Returning to process 300, once the candidate UEs are identified, the base station then pairs (step 350) UE candidates together. In this step, the base station determines which UE candidates to pair together on the same radio resource, which UE of the pair will be using the base layer, and which UE of the pair will be using the enhanced layer. The modulation structure for each radio resource is also determined by the base station for both layers. The selection of pairs can be as simple as analyzing the lists of candidates for both the base layer and enhanced layer and matching one from each group to share a radio resource. For example, a pair selection process may include the steps of: listing UEs in both base and enhanced layer in incrementing order of modulation; selecting the UE at the top of the base layer list to pair with the UE at the top of the enhanced layer list; removing both selected UEs from both lists (note that a selected UE may be in both lists, and should be removed from both); and continuing this process until one of the lists is empty (or until other conditions are met, such as the case in which there are no remaining UE candidates in the lists that have data pending, etc.). Note that in other embodiments of the disclosure, one or both UEs may be maintained in their respective lists until certain conditions are met, such as no more data pending for the UE. Applying this simple approach, the following is a valid selection of three UE pairs for hierarchical modulation from the outcome of the candidate selection procedure noted above. UE_1 is paired with UE_4. UE_7 is paired with UE_8. UE_10 is paired with UE_9.

One of ordinary skill in the art recognizes that in communications systems utilizing multiple enhanced layers, UEs are grouped together in not pairs, but in groups in which the number of UE participants in a group equals the number of total layers, i.e., one base layer plus the number of multiple enhanced layers. For instance, the 6 bits per symbol data carrying capacity of a signal modulated at QAM64 would allow a base layer received at QPSK using 2 bits per symbol data carrying capacity, a first enhanced layer received at QAM16 using an additional 2 bits per symbol data carrying capacity, and a second enhanced layer received at QAM64 using the remaining 2 bits per symbol data carrying capacity.

The UE selection process may be optimized based on one or more additional considerations. For example, the modulation level may be maximized for the enhanced layer for as many pairs as possible. Selection of candidates to form pairs can be prioritized based on use criteria, which may include selecting UEs in the base layer that have more tolerance to some degradation in SINR without significant rise in BER (such as select them in a decreasing order of headroom). For UEs in enhanced layer groups, UEs are selected that have a small amount of pending data to be delivered (whether all pending data or for a specific bearer, such as short messages to M2M devices) or optionally matched to the available capacity of assigned radio resources. UEs may also be selected with a high demand for low latency on their transmitted data, and for which their delay budget is about to be exceeded such as low delay VoIP streams as determined by the UE's QoS parameters. UEs can be selected for the base layer that are running transport/application data streams with high BER tolerance (application aware headroom adjustment), such as UDP versus TCP. UEs can be selected to achieve scheduler algorithm criteria such as fairness or meeting guaranteed bit rate (GBR) values. Otherwise, UEs that are candidates for the base layer and have more tolerance to signal quality degradation may be matched with UEs running the least robust modulation schemes, while UEs having less tolerance to signal quality degradation may be matched with UEs operating at more robust modulation schemes. For example, if a UE is using QPSK with high tolerance to degradation of SINR, it can be matched with another UE using QAM64, while another UE using QPSK, but having less tolerance to degradation of SINR can be matched with a UE using QAM16.

In an embodiment of the disclosure, system congestion level may impact the percentage of UEs that are matched in a hierarchical modulation scheme. System congestion can be measured based on the instantaneous amount of data pending in the queues to be transmitted in the downlink, or it can be based on some historical measurements of data pending in queues, or it can be based on any other metric of the capacity of the base station to meet the committed throughput to its UEs.

In another embodiment of the disclosure, a cost function is utilized that is built to combine the effect of the above-mentioned criteria, or a subset of them. This cost function can be a weighted sum of the factors, with the weights reflecting the importance of each factor and its significance in the selection of pairs.

Upon pairing, UE control information is then prepared (step 360) for transmission to the paired UEs via radio resource allocation messages. The role of the control information is to describe the UE allocations. Multiple UEs will be allocated the same radio resource, and therefore some changes may be had to the format of the associated control information. In an embodiment of the disclosure, the allocation message introduces new information elements, such as elements indicating that hierarchical modulation is used for certain resources and which UE is to receive the base layer or the enhanced layer, to accommodate multiple UEs for the same radio resource. In an alternative embodiment of the disclosure, multiple information elements are used for the same radio resource, one for each UE involved in the allocation of this radio resource.

Use of hierarchical modulation may result in growth of the size of the allocation messages in the control information, and this growth can be mitigated by applying hierarchical modulation on the control information itself. UEs that can operate using an enhanced layer may receive their resource assignment on an enhanced layer, and UEs that operate only using a base layer may receive their resource assignment on a base layer. In an aspect of the disclosure, an auto detection mechanism is employed so that each UE gets its allocation without being informed in advance of the assigned modulation for its allocation description. For example, each UE may try to decode the control information using the last recommended hierarchical modulation scheme, and more robust modulations. In an alternate aspect, the first part of the control information is coded in the most robust modulation scheme, without hierarchical modulation, so that all UEs are able to detect it. The first part of the control information may describe how to find the rest of the control information that contains the allocation information, wherein the rest of the control information may be transmitted using hierarchical modulation.

The control information is then sent (step 370) from the base station to the UEs in the downlink. Some communication systems use scrambling as part of the transmit path, and use the UE identity as part of the utilized scrambling seed. The use of hierarchical modulation has an impact on this scheme because now the radio resource is targeted at multiple UEs. This will have the base layer and the enhanced layer to be combined after the scrambling module, for instance via the hierarchical modulation aware multiplexer 530 in FIG. 5, so that each stream will be scrambled with its destined UE identity.

Figure 5:
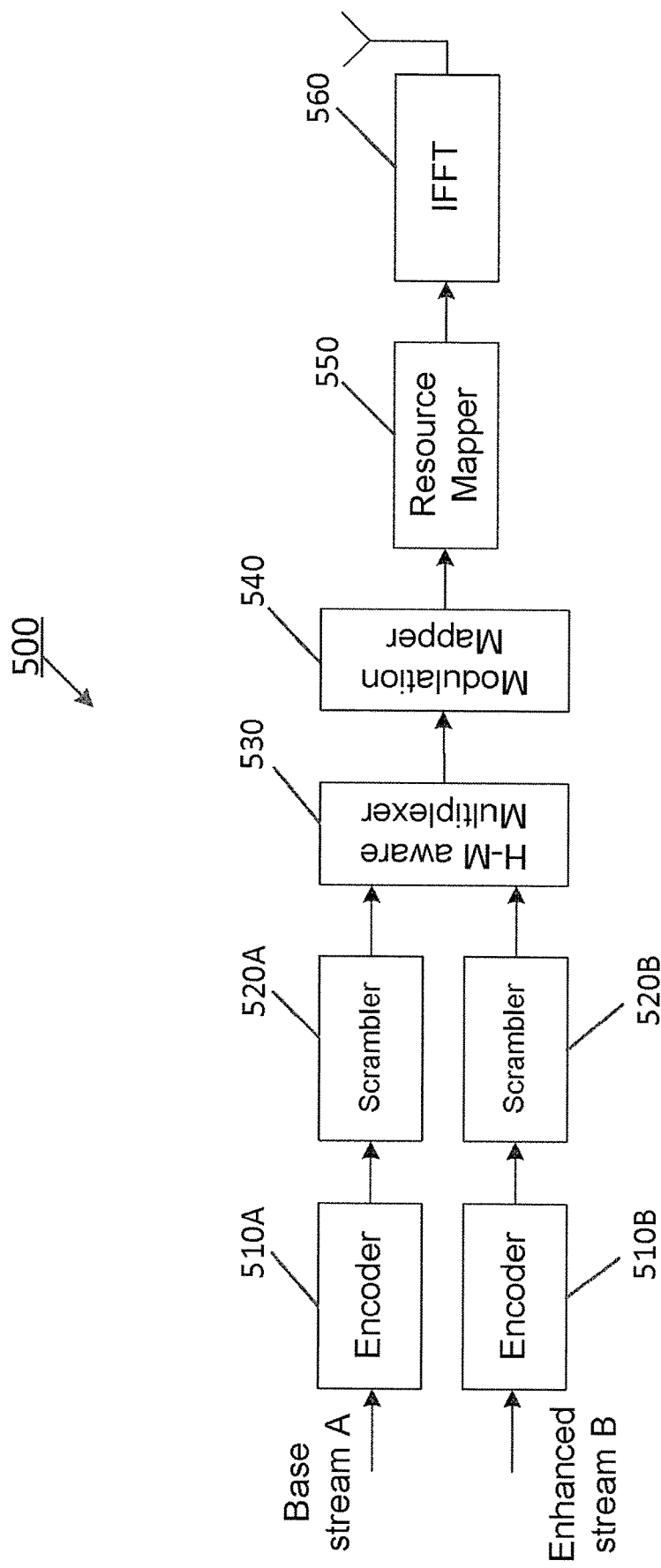
FIG. 5 illustrates an orthogonal frequency-division multiplexing (OFDM) transmitter according to an embodiment of the disclosure.

FIG. 5 illustrates a transmitter 500, such as might be used in a base station, according to an embodiment of the disclosure. Here, the transmitter 500 comprises an orthogonal frequency-division multiplexing (OFDM) transmit-pipeline, such as may be used in the downlink for LTE (as an example of a communications standard), on which hierarchical modulation can be applied. The transmitter 500 comprises encoders 510A and 510B, scramblers 520A and 520B, a hierarchical modulation aware multiplexer 530, a modulation mapper 540, a resource mapper 550, and an inverse fast Fourier transform algorithm (IFFT) 560. In an embodiment of the disclosure, scramblers 520A and 520B use the identity of a recipient UE as part of the scrambling seed, which is in some standards such as LTE. Encoder 510A and scrambler 520A operate on the base layer stream A. Encoder 520B and scrambler 520B operate on the enhanced layer stream B. Since the base layer and enhanced layer(s) are destined to different UEs, the combining of the base and enhanced layer streams is performed after the scrambling in the transmit pipeline. Scrambling and encoding may be optional. The reception path in the UE will need to implement the reverse of the encoding and scrambling techniques implemented in the transmit path in the base station.

In an example (e.g., FIG. 2B), the hierarchical modulation aware multiplexer 530 multiplexes a 2 bits per symbol base layer (e.g., to be received as QPSK) stream A and 4 bits per symbol enhanced layer stream B, which are then modulated into a 6 bits per symbol QAM64 constellation by modulation mapper 540. One of ordinary skill in the art would understand the multiplexing of streams of other bits per symbol capacities into a single stream for transmission at a chosen modulation. The implementation of the modulation mapper 540 and resource mapper 550 are apparent to one of ordinary skill in the art. In an aspect of the disclosure, the modulation mapper 540 receives scrambled stream bits and converts them to constellation locations, and resource mapper 550 maps individual QAM symbols to subcarriers.

Figure 6:
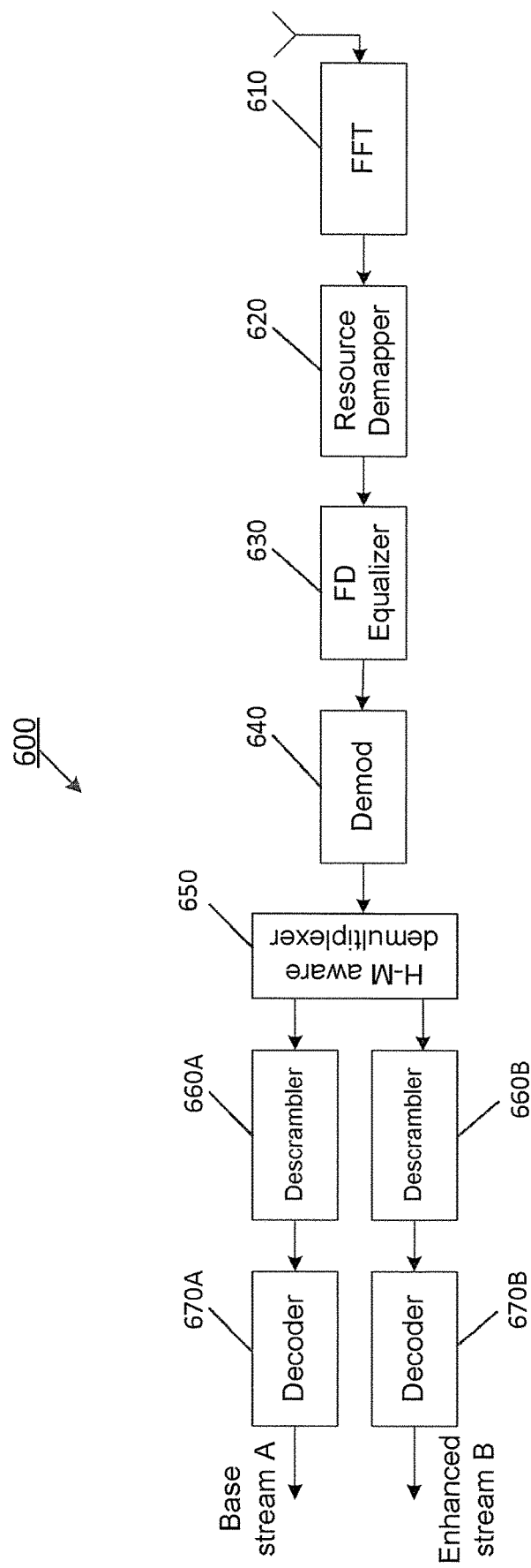
FIG. 6 illustrates an OFDM receiver according to an embodiment of the disclosure.

FIG. 6 illustrates a receiver 600, such as might be used in a UE, according to an embodiment of the disclosure. Here, the receiver 600 comprises an OFDM transmit pipeline, such as may be used in the downlink for LTE (as an example of a communications standard), on which hierarchical modulation can be applied. The hierarchical modulation enabled receiver 600 comprises a fast Fourier transform (FFT) algorithm 610, a resource demapper 620, a frequency domain equalizer 630, and a demodulator 640. Implementation of the FFT algorithm 610, the resource demapper 620, and the frequency domain equalizer is apparent to one of ordinary skill in the art. The demodulator 640 demodulates the incoming data stream. For example (e.g., FIG. 2B), when the hierarchical modulation system is utilizing a 2 bits per symbol base layer and a 4 bits per symbol enhanced layer, the demodulator 640 of a UE receiving only the base layer demodulates the signal with QPSK, receiving the 2 bits per symbol base layer stream A, but the demodulator 640 of a UE receiving the enhanced layer demodulates the signal with QAM64 and receives all 6 bits per symbol of the both the base layer stream A and the enhanced layer stream B.

The receiver 600 further comprises a hierarchical modulation aware demultiplexer 650, which demultiplexes the incoming data stream into base stream A and enhanced stream B, when receiving the enhanced layer or receiving both the base and enhanced layers. Referring back to FIG. 2A, in this example, the demultiplexer 650 delineates the first two bits of each symbol as the base layer and the last two bits of each symbol as the enhanced layer.

Base stream A is descrambled and decoded by descrambler 660A and decoder 670A, respectively. Enhanced stream B is descrambled and decoded by descrambler 660B and decoder 670B, respectively. Descramblers 660A and 660B, and decoders 670A and 670B, the implementation of all of which is apparent to one of ordinary skill in the art, may be omitted if scrambling and coding is not utilized on the transmission side. The control information sent by the base station may be received via the respective base stream or enhanced stream, or both, that has been allocated to the receiver 600.

Returning to process 300, the base station prepares (step 380) the data streams for the UEs sharing the data channel. Here, the multiplexing (e.g., 2 bits per symbol on the base layer and 4 bits per symbol on the enhanced layer if following the example of FIG. 2B) is performed on the data streams associated with the particular UEs of a hierarchical modulation pair into a single constellation in order to implement the hierarchical modulation scheme. The multiplexed streams are then transmitted (step 390) on the downlink channel as a higher order modulation transmission. Each UE of the pair receives the transmission. A UE receiving only the base layer may receive using the lower order modulation of the same bits per symbol data carrying capacity as the base layer. A UE receiving the enhanced layer receives using the higher order modulation useful to carry the base and enhanced layer and discards all layers except for its assigned layer(s).

In an embodiment of the disclosure, techniques such as, but not limited to rotation of enhanced layer constellation points, which are described below, may be applied to reduce the inter-layer interference in hierarchical modulation.

The inventive techniques described herein are also applicable to multiple input/multiple output (MIMO) communications system. MIMO is the use of multiple transmitters and receivers (multiple antennas) on wireless devices for improved performance. When two transmitters and two or more receivers are used, two simultaneous data streams (or "layers") can be sent, which doubles the data rate. For example, the IEEE 802.11n (Wi-Fi) wireless standard uses MIMO to increase speed to 100 Mbps and beyond. MIMO antennas are also used in WiMAX and LTE.

Each MIMO layer can be treated as a separate instantiation of hierarchical modulation. As such, the primary difference from a non-hierarchical modulation transmitter is the need to apply forward error correction (FEC) and scrambling, if any, prior to multiplexing the streams in a hierarchical modulation aware manner in preparation for modulation. Note that with MIMO, one or more MIMO layers may have hierarchical modulation applied even if the other layer(s) are using traditional modulation. For each MIMO layer on which hierarchical modulation was applied, the receiver applies descrambling and decoding of FEC, if any, independently on each data stream after hierarchical modulation aware de-multiplexing of the demodulator output.

Figure 7:
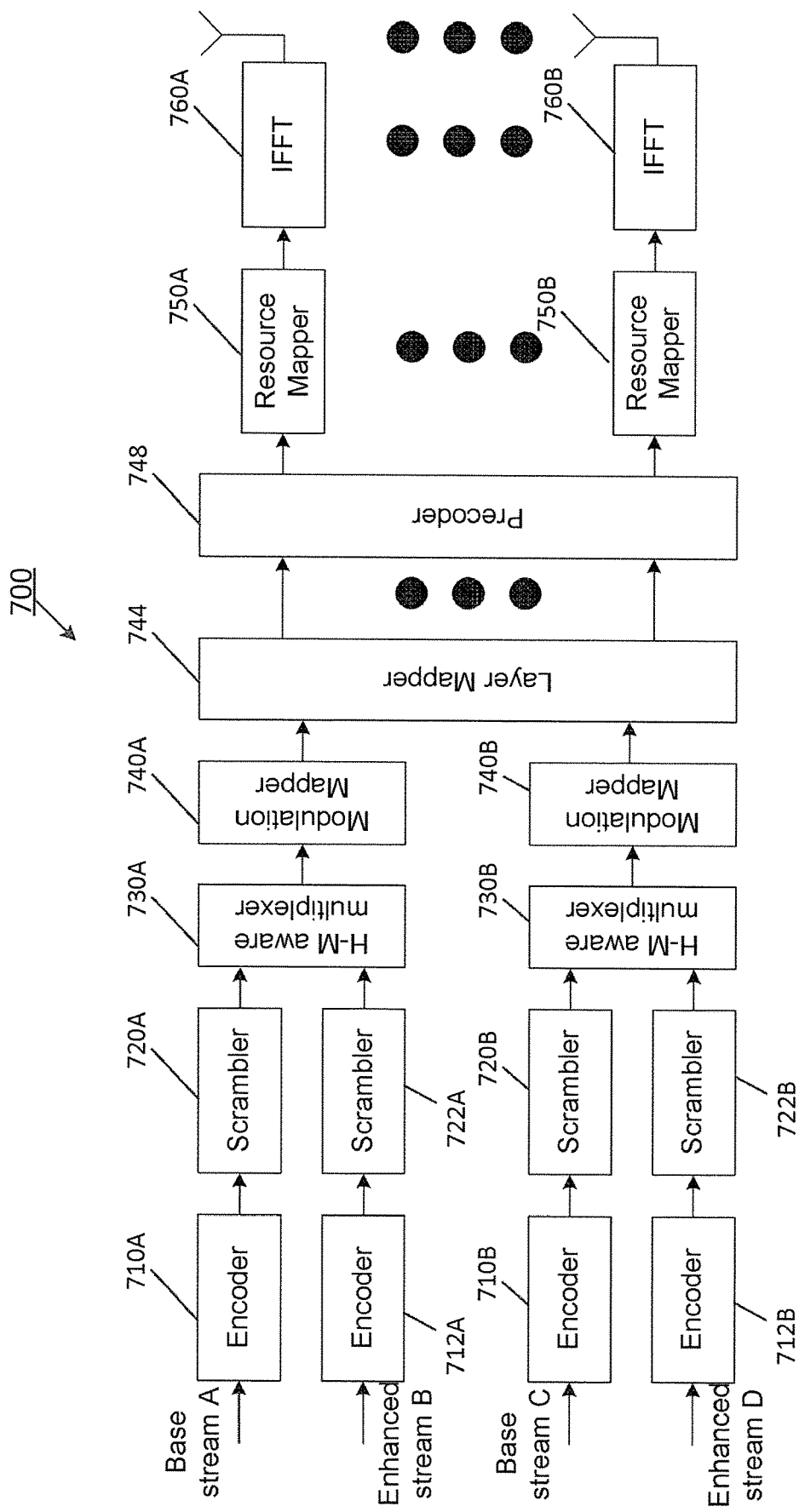
FIG. 7 illustrates a hierarchical modulation enabled multiple input multiple output (MIMO) OFDM transmitter according to an embodiment of the disclosure.

FIG. 7 illustrates a hierarchical modulation enabled MIMO transmitter 700 according to an embodiment of the disclosure. Here the MIMO transmitter 700 is capable of transmitting two data streams, each of which is subject to hierarchical modulation, e.g., first data stream comprises base stream A and enhanced stream B, and second data stream comprises base stream C and enhanced stream C. In this exemplary embodiment of the disclosure, the MIMO transmitter 700 facilitates OFDM in, for example, an LTE downlink.

MIMO transmitter 700 comprises encoders 710A, 712A, 710B, and 712B, and scramblers 720A, 722A, 720B, and 722B. Encoder 710A and scrambler 720A operate on base stream A. Encoder 712A and scrambler 722A operate on enhanced layer B. Encoder 710B and scrambler 720B operate on base stream C. Encoder 712B and scrambler 722B operate on enhanced layer D. The encoded and scrambled base stream A and enhanced stream B are multiplexed via hierarchical modulation aware multiplexer 730A. The encoded and scrambled base stream C and enhanced stream D are multiplexed via hierarchical modulation aware multiplexer 730B.

As mentioned above, the implementation of modulation mappers 740A and 740B and resource mappers 750A and 750B are readily apparent to one of ordinary skill in the art. The implementation of the layer mapper 744 is also apparent to one of ordinary skill in the art. In an aspect of the disclosure, the layer mapper 744 may process multiple streams to generate output MIMO layers. Implementation of the precoder 748 is apparent to one of ordinary skill in the art. In an aspect of the disclosure, the precoder 748 may further process layers to improve communication efficiency.

Figure 8:
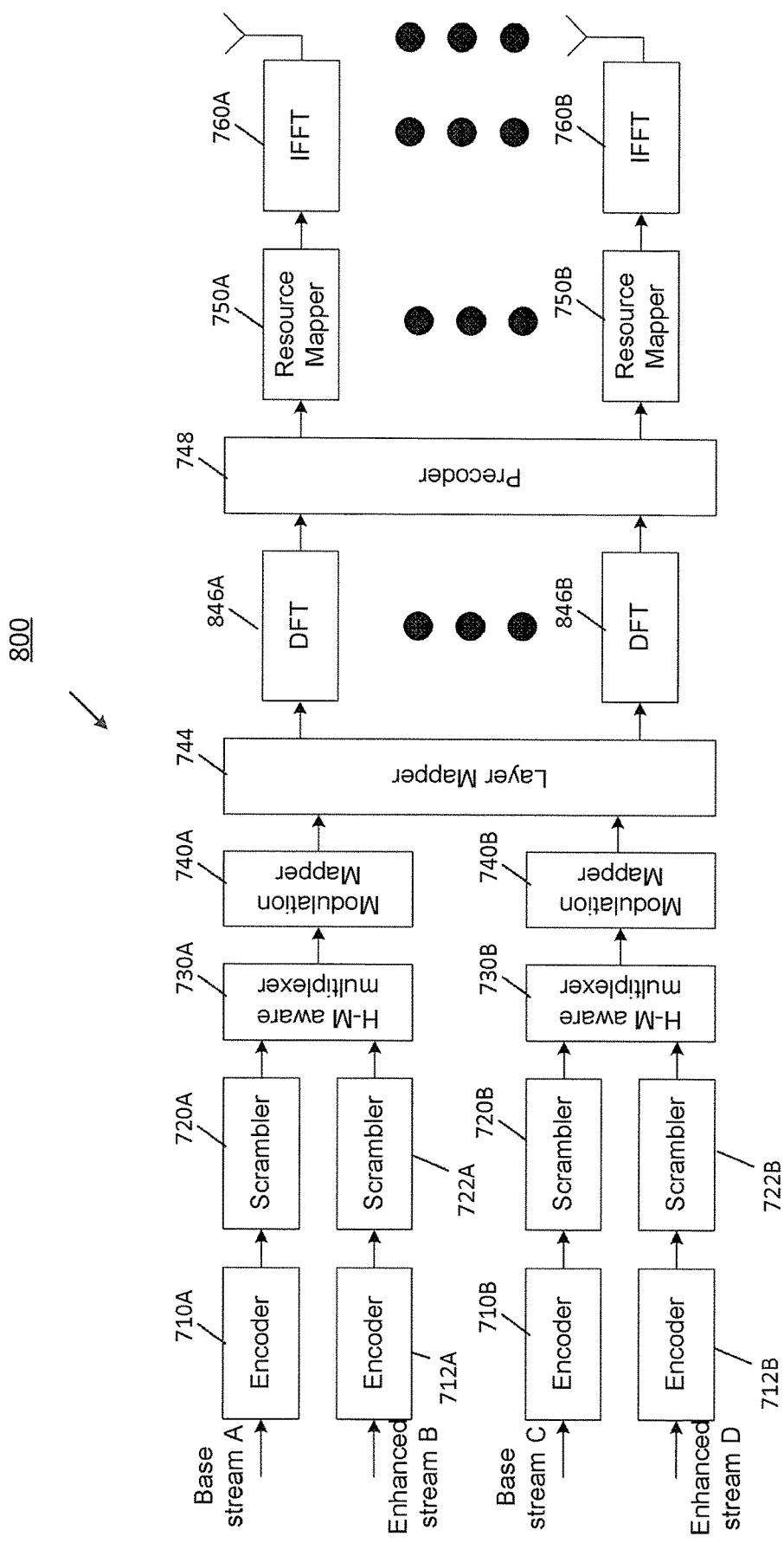
FIG. 8 illustrates a hierarchical modulation enabled MIMO single carrier frequency division multiple access (SC-FDMA) transmitter according to an embodiment of the disclosure.

FIG. 8 illustrates a hierarchical modulation enabled MIMO transmitter 800 according to an embodiment of the disclosure. Here, the transmitter 800 facilitates single carrier frequency-division multiple access (SC-FDMA) multiplexing in, for example, an LTE uplink. MIMO transmitter 800 comprises the circuitry components of transmitter 700 in addition to discrete Fourier transform (DFT) modules 846A and 846B, the implementation of which is apparent to one of ordinary skill in the art.

Figure 9:
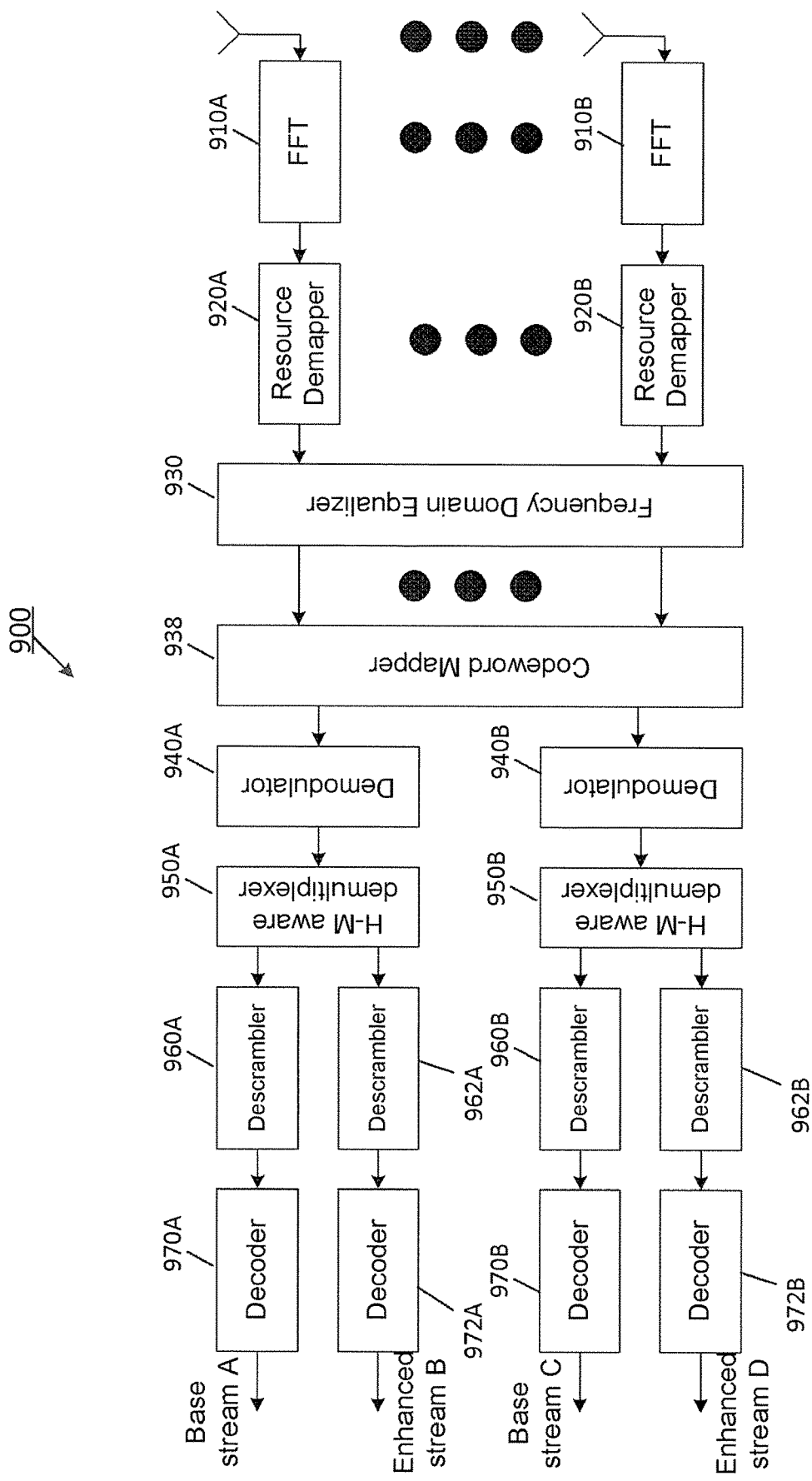
FIG. 9 illustrates a hierarchical modulation enabled MIMO OFDM receiver according to an embodiment of the disclosure.

FIG. 9 illustrates a hierarchical modulation enabled MIMO receiver 900 according to an embodiment of the disclosure. In this exemplary embodiment of the disclosure, the MIMO receiver 900 facilitates orthogonal frequency-division multiplexing (OFDM) in, for example, an LTE downlink. MIMO receiver 900 comprises a fast Fourier transform (FFT) algorithms 910A and 910B, a resource demappers 920A and 920B, a frequency domain equalizer 930, and codeword mapper 938, the implementation of which is apparent to one of ordinary skill in the art. In an aspect of the disclosure, codeword mapper 938 may receive MIMO layer inputs and convert them to separate MIMO codeword streams.

First and second MIMO codeword streams are processed by demodulators 940A and 940B, and hierarchical modulation aware demultiplexers 950A and 950B. Demultiplexers 950A and 1350B split the first data stream into base stream A and enhanced stream B, and split the second data stream into base stream C and enhanced stream D, respectively. Base stream A is descrambled and decoded by descrambler 960A and decoder 970A, respectively. Enhanced stream B is descrambled and decoded by descrambler 962A and decoder 972A, respectively. Base stream C is descrambled and decoded by descrambler 960B and decoder 970B, respectively. Enhanced stream D is descrambled and decoded by descrambler 962B and decoder 972B, respectively.

Figure 10:
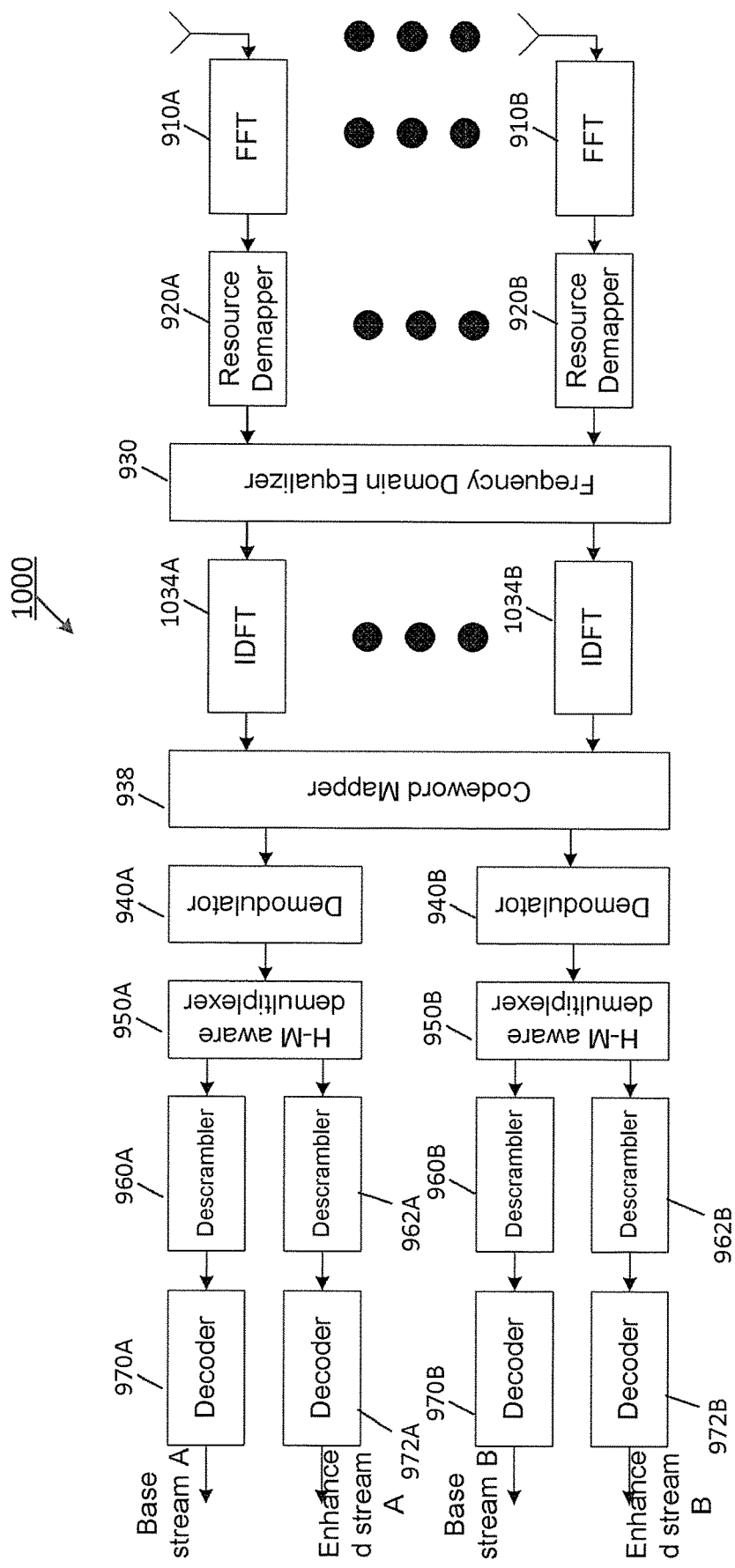
FIG. 10 illustrates a hierarchical modulation enabled MIMO SC-FDMA receiver according to an embodiment of the disclosure.

FIG. 10 illustrates a hierarchical modulation enabled MIMO receiver 1000 according to an embodiment of the disclosure. Here, the receiver 1000 facilitates single carrier frequency-division multiple access (SC-FDMA) multiplexing in, for example, an LTE uplink. MIMO receiver 1000 comprises the circuitry components of receiver 900 in addition to inverse discrete Fourier transform IDFT modules 1034A and 1034B, the implementation of which are apparent to one of ordinary skill in the art.

Hybrid automatic repeat request (hybrid ARQ or HARQ) is a combination of high-rate FEC and ARQ error-control. In standard ARQ, redundant bits are added to data to be transmitted using an error-detecting (ED) code such as a cyclic redundancy check (CRC). HARQ is the retransmission of previously transmitted data or additional FEC bits to allow FEC to recover data that was unrecoverable solely from the original transmission.

Although certain systems tend to resend at the modulation and coding scheme (MCS) of the original transmission, technically speaking, HARQ retransmissions may use any MCS. This is an important consideration for efficient interaction between hierarchical modulation and HARQ. Retransmitting at the original MCS would have both streams A and B to be retransmitted, which would be inefficient if one of the streams had been received correctly.

In such a case where a system has an identical retransmission, the two streams may be treated as a single HARQ process or as separate HARQ processes. A device which successfully received its original transmission may ignore the data received in the retransmission. The device must be made aware from scheduling signaling that it is receiving a retransmission rather than an original transmission of new data.

However, since determination of successful receipt of the data for a stream, for example via FEC decode, is conducted after de-multiplexing in the receive chain, each stream can be treated as an independent HARQ process (i.e., retransmission timing and parameters may be independent for the two streams). If, for a hierarchical modulation transmission, the data for stream A is received correctly, but the data for stream B is not received correctly, only the data from stream B need be retransmitted (or additional parity transmitted, depending on the form of HARQ used). Because this data is independent, it can be retransmitted as a single user transmission using any appropriate MCS or may be transmitted as part of a new hierarchical modulation transmission.

Hierarchical modulation can also be applied in the uplink (UL) for two data streams from the same UE. If all applications (e.g., email, VoIP, streaming video, adaptive streaming video, FTP, etc.) and transport protocols (e.g., TCP, UDP) were equal, a UE would be commanded to transmit at the most efficient modulation that still achieves an acceptable bit error rate when the signal is received at the base station. However, a UE may have multiple UL services active at any point in time. These services may have different tolerances to bit errors or delays. For instance video streamed over TCP may desire a lower bit error rate (BER) than video streamed over UDP. The lower bit error rate may be desirable in this instance to minimize freeze-causing TCP retransmissions. In another example, voice over IP may be intolerant of the delays associated with TCP retransmissions and may desire a lower bit error rate than a background email update or a file download which can tolerate such delays.

The desired modulation rate for a UE uplink may be chosen to achieve a target BER or block error rate (BLER) given the current physical layer signal quality metrics (e.g., SNR, RSSI, etc.). The target BER may be a function of the UE's services and their characteristics including application and transport protocol. Preferably, each service would have a target BER. One skilled in the art would understand that a target BER, based on applications and transport protocols, could also be chosen for an entire group of UL services, such as the services reported jointly in an LTE buffer status report, including the group of all UL services active at a UE.

If the difference in bit error rate tolerance is such that the preferred modulation for each of a pair of streams, or groups of streams, is different, hierarchical modulation in the uplink transmission of the UE may be used to increase the overall throughput of the uplink relative to having the UE transmit both streams at the more robust modulation or transmitting them serially with different modulations.

Figure 11:
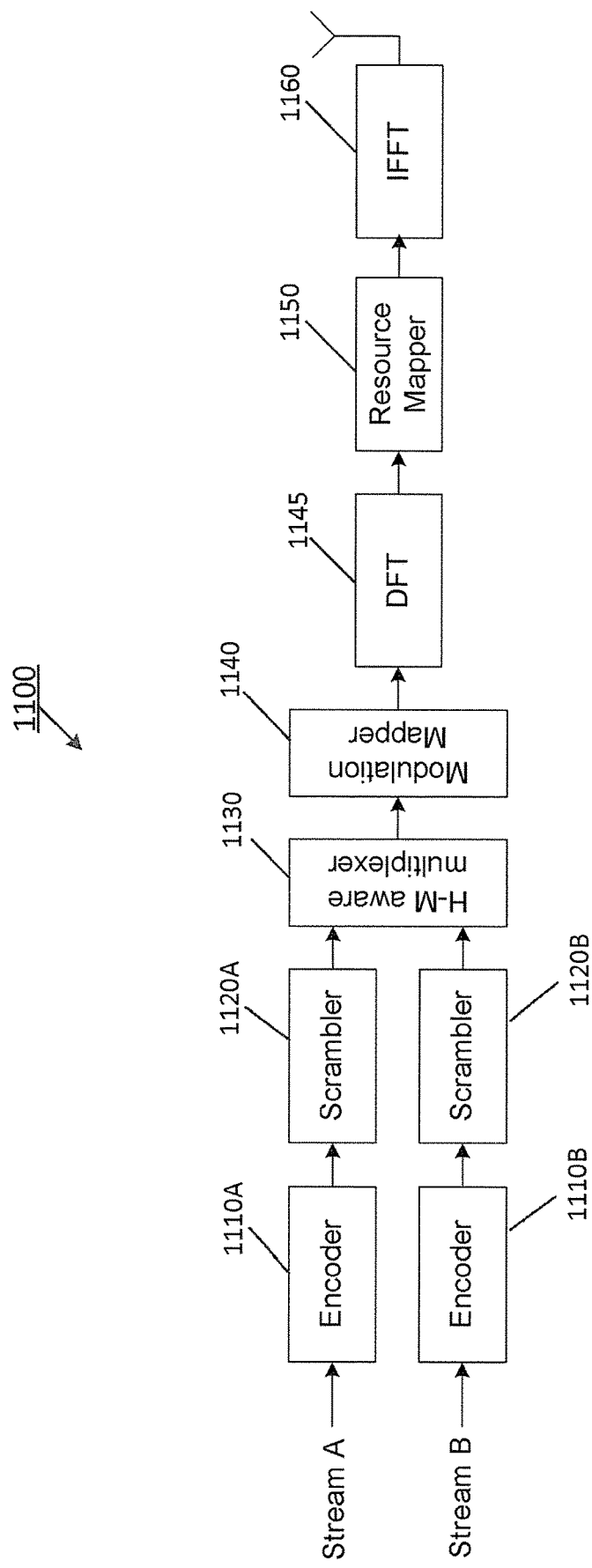
FIG. 11 illustrates a hierarchical modulation enabled SC-FDMA transmitter, such as might be used in a UE, according to an embodiment of the disclosure.

FIG. 11 illustrates a transmitter 1100, such as might be used in a UE, according to an embodiment of the disclosure. Here, the transmitter 1100 is processing an SC-FDM uplink on which hierarchical modulation can be applied. For example, the transmitter 1100 may multiplex two streams (i.e., stream A and stream B) onto a higher order modulation, such as QAM-16, with stream A requiring a more robust modulation being mapped to the bits defining the quadrant, effectively QPSK modulation, and the more error or delay tolerant stream B being mapped to the two bits that govern the position of a QAM-16 constellation point within the quadrant (e.g., see FIG. 2A). The transmitter 1100 comprises encoders 1110A and 1110B, scramblers 1120A and 1120B, a hierarchical modulation aware multiplexer 1130, a modulation mapper 1140, a DFT module 1145, a resource mapper 1150, and an inverse fast Fourier transform algorithm (IFFT) 1160. Scrambling and encoding may be optional.

Figure 12:
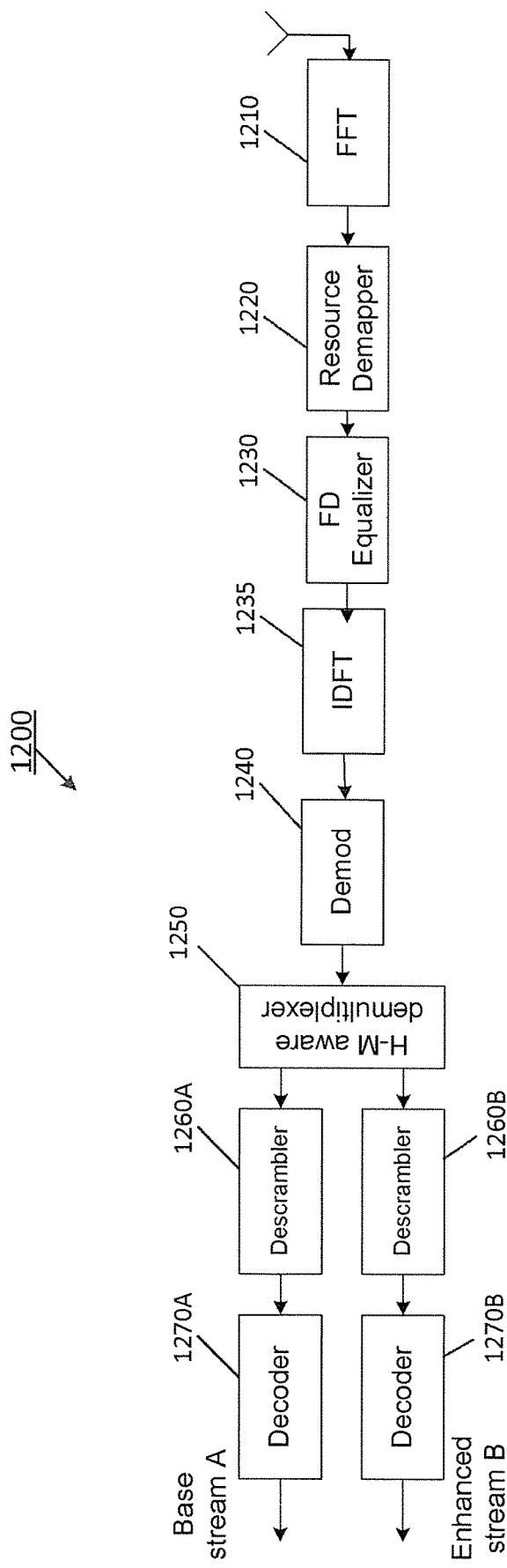
FIG. 12 illustrates a hierarchical modulation enabled SC-FDMA receiver, such as might be used in a base station, according to an embodiment of the disclosure.

FIG. 12 illustrates a complimentary hierarchical modulation aware receiver 1200, such as might be used in a base station, for the SC-FDM uplink, according to an embodiment of the disclosure. The receiver 1200 comprises a fast Fourier transform (FFT) algorithm 1210, a resource demapper 1220, a frequency domain equalizer 1230, an IDFT module 1235, a demodulator 1240, and a hierarchical modulation aware demultiplexer 1250. The base station would receive the stream, for instance, as QAM-16 and then de-multiplex the bits (via demultiplexer 1250) indicating the quadrant into stream A and the remaining bits into stream B (e.g., see FIG. 2A). The reception path in the UE implements the reverse of the encoding and scrambling techniques implemented in the transmit path in the UE via descramblers 1260A and 1260B, and decoders 1270A and 1270B.

Similarly, one of ordinary skill in the art readily understands how to apply the above-described techniques and embodiments to an OFDM or OFDMA uplink.

Figure 13:
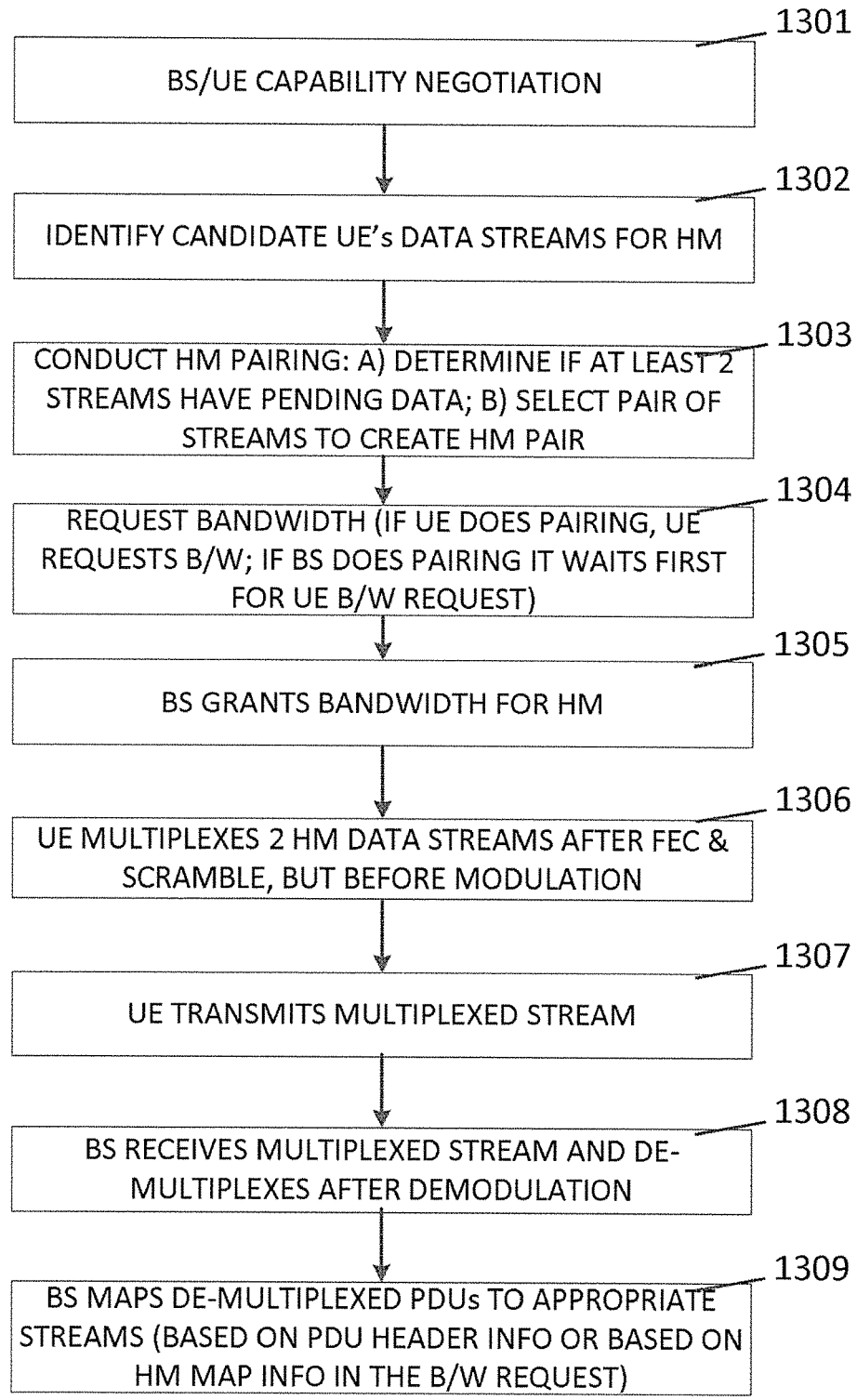
FIG. 13 illustrates a process of uplink hierarchical modulation for two data streams from the same UE according to an embodiment of the disclosure.

FIG. 13 illustrates a process 1300 for uplink hierarchical modulation of two data streams transmitted from the same UE according to an embodiment of the disclosure. The process 1300 begins by the base station and the UE negotiating (step 1301) in order to make sure that both devices are capable of supporting hierarchical modulation and currently are operating under conditions that allow them to engage in the hierarchical modulation scheme. For example, the base station or the UE may not currently have a sufficient channel condition to allow for engagement in the hierarchical modulation scheme. In that case, hierarchical modulation is impractical. Negotiation is an optional step because in some embodiments the wireless system may have the base station and the UE to periodically report its ability to engage in the hierarchical modulation scheme. Similarly, in an embodiment of the disclosure, the wireless system may be that all devices in the system support hierarchical modulation and negotiation would be not helpful. This step may be initiated by the UE or the base station as the following describes in greater detail.

The current data streams supporting services in a particular UE are identified (step 1302) as candidates for pairing in the uplink hierarchical modulation scheme. Each data stream may be classified as a candidate for the base layer or the enhanced layer of the hierarchical modulation scheme, or may be classified as a candidate for both layers. The determination of which candidate layer each data stream may be identified with may depend on the policy, the class of service, tolerance to impairments such as bit errors or retransmissions, and other considerations and specifications associated with that data stream. The functionality of this step may be performed in the UE, the base station or in another node in the network. If the data stream candidate selection is performed in a network node other than the base station or the UE, then the list of data stream candidates for the base layer and the enhanced layer will need to be sent to the entity (either the base station or the UE) that performs pairing of the candidate data streams into hierarchical modulation pairs.

The candidate data streams are reviewed and certain candidates are selected and paired (step 1303) into hierarchical modulation pairs. As stated above, this step may be performed by the UE or the base station. The hierarchical modulation pair is comprised of a data stream from the base layer candidate list and a data stream from the enhanced layer candidate list. In an embodiment in which the UE performs this step, the UE may conduct this hierarchical modulation pairing after conducting the candidate identification step. In an embodiment in which the base station performs this step, the base station may wait to perform this hierarchical modulation pairing until receiving a bandwidth request from the UE associated with the user streams. Regardless of which entity performs this step, the matching of candidate data streams may be conducted by first identifying data stream candidates from each of the base layer and enhanced layer candidate lists that have data pending for uplink transmission. Next, a candidate data stream from the base layer list and a candidate data stream from the enhanced layer list are selected to create a hierarchical modulation pair.

The UE requests (step 1304) uplink bandwidth from the base station to support uplink transmission of the data associated with the data streams of the hierarchical modulation pair. As mentioned above, if the UE is performing the pairing step then this bandwidth request is sent after the pairing step. However, if the base station is performing the pairing step then the base station may wait until after it receives a bandwidth request from the UE before performing the pairing step. In the embodiment in which the UE is performing the pairing step, the user equipment includes an indication that hierarchical modulation will be used in the bandwidth request that is sent to the base station.

The base station grants the bandwidth request by sending (step 1305) a bandwidth allocation in the downlink channel to the UE. Upon receiving the bandwidth allocation, the UE proceeds to multiplex (step 1306) the data to be sent in the uplink for the two data streams associated with the hierarchical modulation pair. The multiplexing of the data for the two data streams is performed after the forward error correction and the scrambling, but before modulation. In other embodiments of the disclosure, forward error correction and/or the scrambling may not be utilized, but to the extent that those functions are present they are performed prior to the multiplexing. The resulting single multiplexed data stream is comprised of data from the base layer data stream and data from the enhanced layer data stream. Next, the single multiplexed data stream is transmitted (step 1307) from the UE over the allocated uplink bandwidth to the base station.

The base station receives (step 1308) the single multiplexed data stream and de-multiplexes the data after demodulation of the received signal. In this manner, the base station retrieves base layer data, i.e., protocol data units (PDUs), and enhanced layer data, i.e., PDUs, from the received single multiplexed data stream. The base station then maps (step 1309) the retrieved PDUs to the appropriate data streams associated with the hierarchical modulation pair. This mapping of the retrieved PDUs to the correct data streams may be performed by inspecting the header information in each PDU or by relying upon hierarchical data stream pair mapping information contained in the bandwidth request received from the user equipment.

The foregoing description of the functional steps presented in FIG. 13 is an exemplary embodiment of the disclosure and one of ordinary skill in the art appreciates that these functional steps can be performed in a different order and by different entities while still achieving the uplink hierarchical modulation scheme for two data streams of the same UE.

Figure 14:
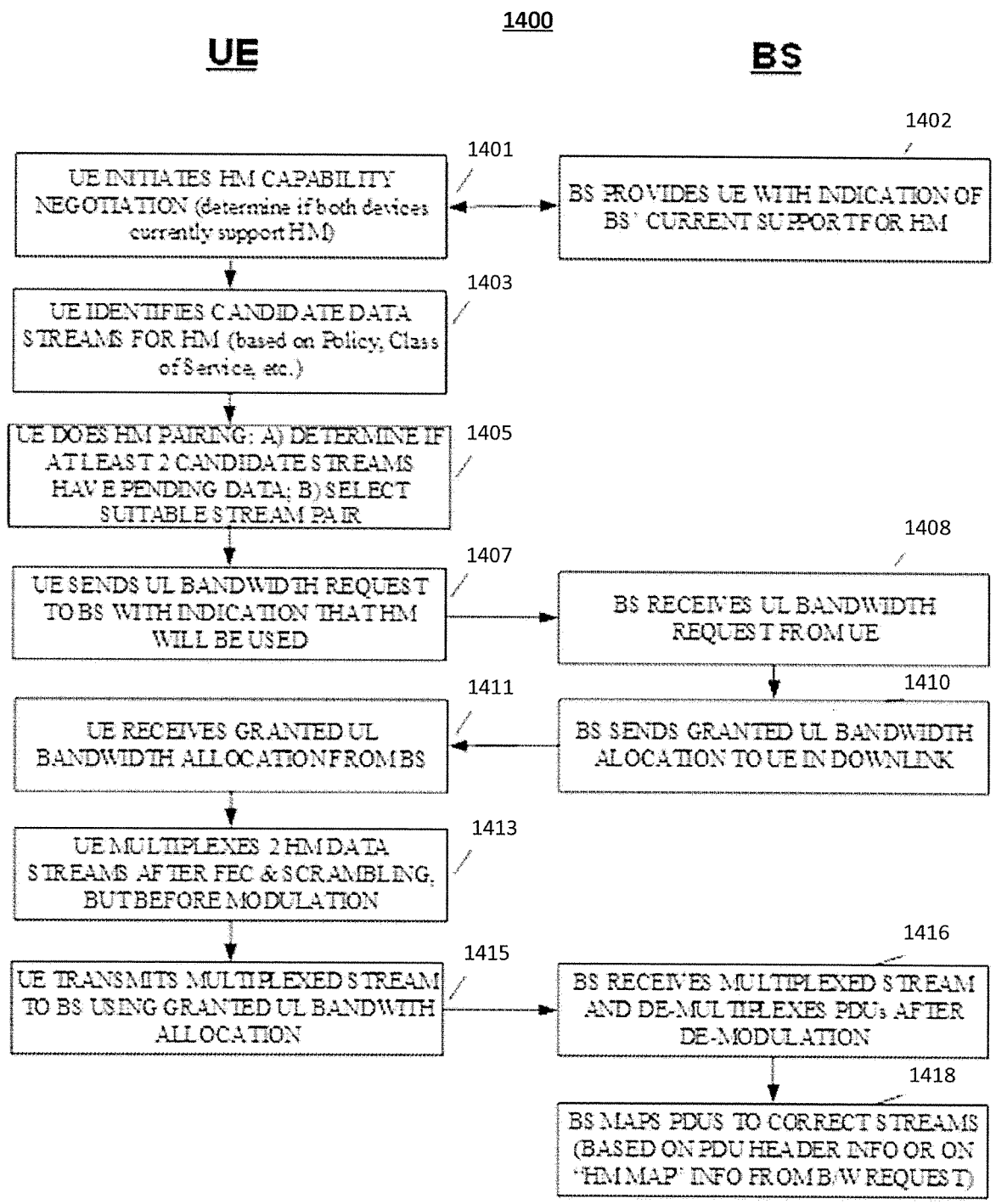
FIG. 14 illustrates a UE initiated process for hierarchical modulation in an uplink for two data streams from the same UE according to an embodiment of the disclosure.

FIG. 14 illustrates a UE initiated hierarchical modulation process 1400 in an uplink for two data streams from the same UE according to an embodiment of the disclosure. Here, the UE not only initiates the hierarchical modulation scheme, but also performs the candidate data stream identification and candidate pairing steps before sending an uplink bandwidth request to the base station along with an indication that hierarchical modulation will be used in the uplink. Particularly, the process 1400 begins with the UE initiating (step 1401) hierarchical capability negotiation in order to determine whether both devices are capable of supporting hierarchical modulation and currently are operating under conditions that allow them to engage in the hierarchical modulation scheme. The base station provides (step 1402) the UE with an indication of its current support for hierarchical modulation. The UE identifies (step 1403) candidate data streams for pairing based on, for example, policy, class of service, tolerance to impairments such as bit errors or retransmissions, and other considerations and specifications associated with that data stream. The UE pairs (step 1405) at least two candidate data streams having pending data. The UE then sends (step 1407) an uplink bandwidth request to the base station indicating that hierarchical modulation will be used.

The base station receives (step 1408) the uplink bandwidth request from the UE. The base station then sends (step 1410) a response indicating granted uplink bandwidth allocating to the UE in downlink, which is received (step 1411) by the UE. Upon receiving the bandwidth allocation, the UE proceeds to multiplex (step 1413) the data to be sent in the uplink for the two data streams associated with the hierarchical modulation pair. The multiplexing of the data for the two data streams is preferably performed after the forward error correction and the scrambling, but before modulation. The single multiplexed data stream is then transmitted (step 1415) by the UE over the allocated uplink bandwidth to the base station. The base station receives (step 1416) the single multiplexed data stream and demultiplexes the PDUs after demodulation. The base station maps (step 1418) the retrieved PDUs to the data streams associated with the hierarchical modulation pair by either inspecting the header information in each PDU or by relying upon hierarchical data stream pair mapping information contained in the bandwidth request received from the UE.

Figure 15:
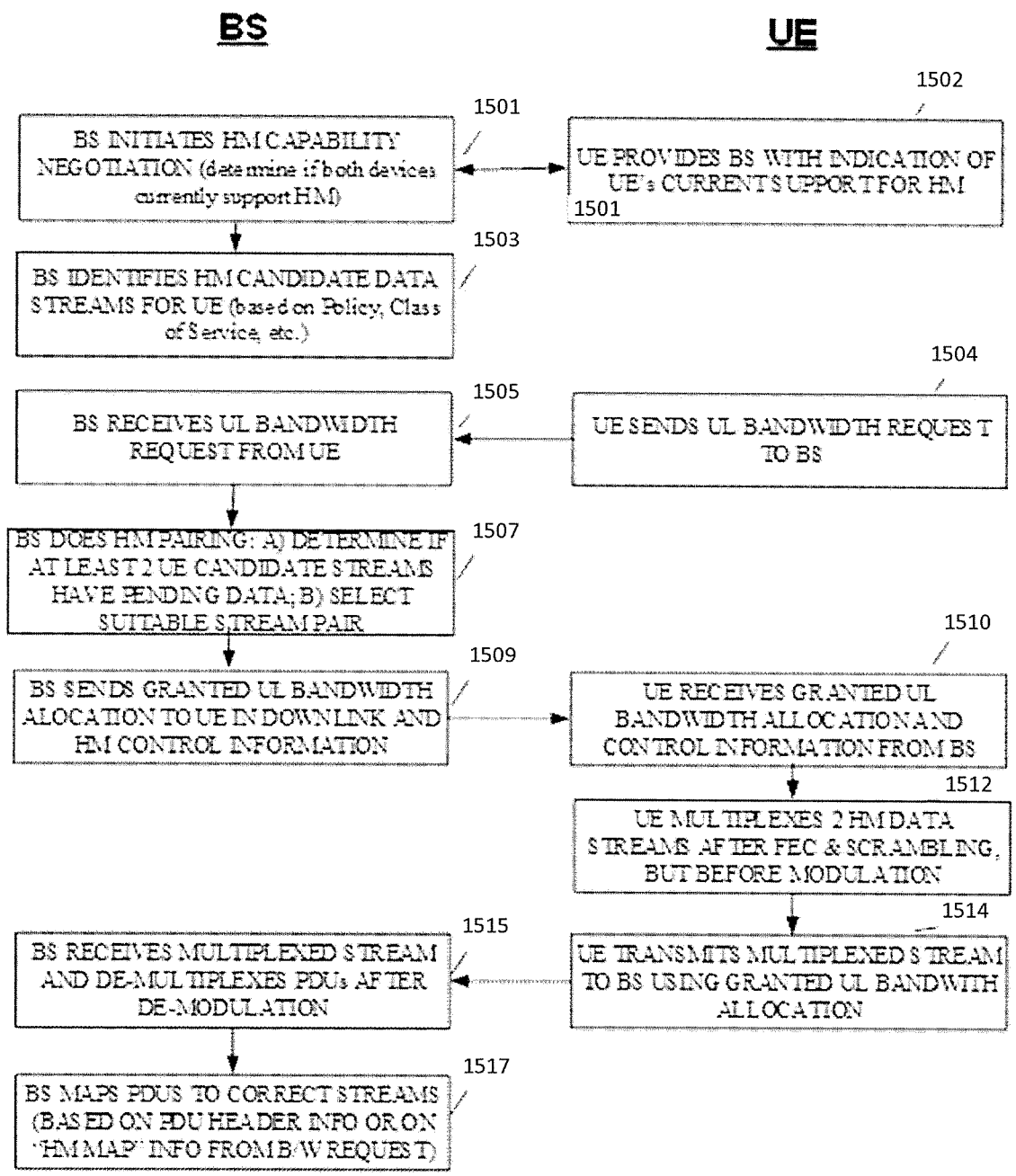
FIG. 15 illustrates a base station initiated process for hierarchical modulation in an uplink for two data streams transmitted from the same UE to the base station according to an embodiment of the disclosure.

FIG. 15 illustrates a base station initiated hierarchical modulation process 1500 in an uplink for two data streams transmitted from the base station according to an embodiment of the disclosure. Here, the base station not only initiates the hierarchical modulation scheme, but also performs the candidate data stream identification and candidate pairing steps after receiving an uplink bandwidth request from the UE. The uplink bandwidth request includes information regarding which UE data streams have data pending at the UE for sending in the uplink. In this embodiment of the disclosure, the base station may also send control information regarding the hierarchical modulation pair to the UE via a control channel so that the UE has notice that hierarchical modulation should be used for the identified data streams associated with the hierarchical modulation pair in the uplink.

The process 1500 begins with the base station initiating (step 1501) hierarchical capability negotiation in order to determine whether both devices are capable of supporting hierarchical modulation and currently are operating under conditions that allow them to engage in the hierarchical modulation scheme. The UE provides (step 1502) the base station with an indication of its current support for hierarchical modulation. The base station identifies (step 1503) candidate data streams for pairing based on, for example, policy, class of service, tolerance to impairments such as bit errors or retransmissions, and other considerations and specifications associated with that data stream. The UE sends (step 1504) one or more uplink bandwidth requests to the base station. Upon receiving (step 1505) the uplink bandwidth requests, the base station pairs (step 1507) at least two candidate data streams having pending data. The base station then sends (step 1509) a response indicating a granted uplink bandwidth allocation and hierarchical modulation control information to the UE in the downlink, which is received (step 1510) by the UE. Upon receiving the bandwidth allocation, the UE proceeds to multiplex (step 1512) the data to be sent in the uplink for the two data streams associated with the hierarchical modulation pair. The multiplexing of the data for the two data streams is preferably performed after the forward error correction and the scrambling, but before modulation. The single multiplexed data stream is then transmitted (step 1514) by the UE over the allocated uplink bandwidth to the base station. The base station receives (step 1515) the single multiplexed data stream and de-multiplexes the PDUs after demodulation. The base station maps (step 1517) the retrieved PDUs to the data streams associated with the hierarchical modulation pair by either inspecting the header information in each PDU or by relying upon hierarchical data stream pair mapping information contained in the bandwidth request received from the UE.

As mentioned, one or more steps of the aforementioned processes may be performed by other network nodes.

One of the main challenges with hierarchical modulation is the introduction of inter-layer interference (ILI) due to the reduction of the noise margin of the base layer by the introduction of the enhanced layer(s). The noise margin in transmitting the base layer only is represented by the distance between the gray dots in FIG. 2B. The addition of the enhanced layer reduces the noise margin to the distance between the higher order constellation points in the figure, which results in a higher bit error rate (BER) for the base layer receivers and affects the overall throughput of the system.

Figure 16:
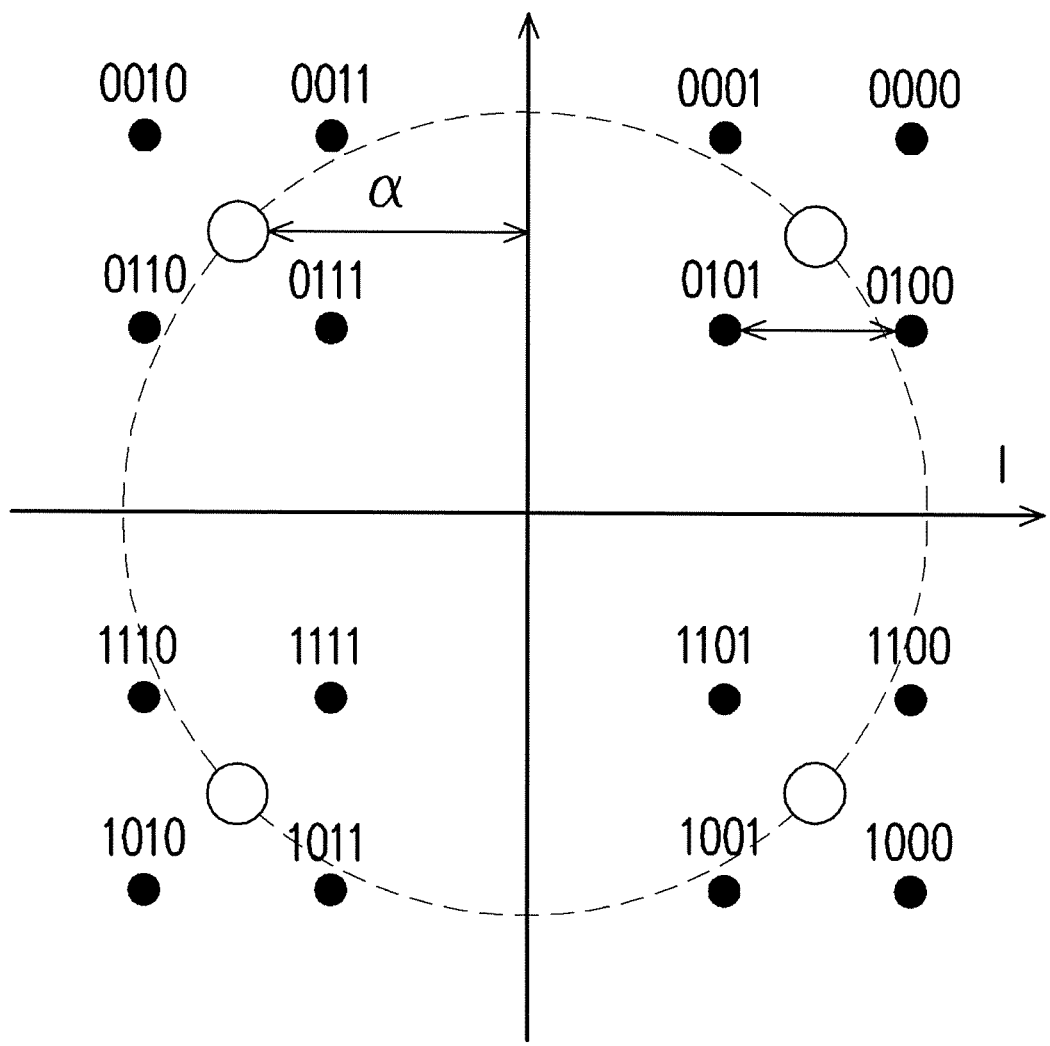
FIG. 16 illustrates a constellation diagram of an implementation of hierarchical modulation according to an embodiment of the disclosure.

FIG. 16 illustrates constellation diagrams of an implementation of hierarchical modulation. The base layer employs QPSK modulation (shown on the top left), which maps to 2 bits per symbol. The enhanced layer also carries 2 bits per symbol requiring a QAM16 modulated signal to carry both layers. Here, the first and third bits of each symbol are used to indicate the quadrant. The minimum Euclidean distance (MED) or $d_{min}$ is a function of α and β in the figure. In case of the base layer alone, the MED would have been:

$$D_{min} = 2\alpha$$

However, with the superimposing of the enhanced layer, the MED is reduced to be:

$$D_{min}=\min(2\alpha(\alpha-\beta),2\alpha,2\beta)$$

The reduction in MED results in more ambiguity in the demodulator which is attempting to demodulate the base layer by, for example, discerning the quadrant. This then results in more demodulation errors. This is especially true when the higher order modulation constellation helpful to carry both the base and enhanced layers has constellation points close to one of the quadrature or in-phase axis.

Figure 17:
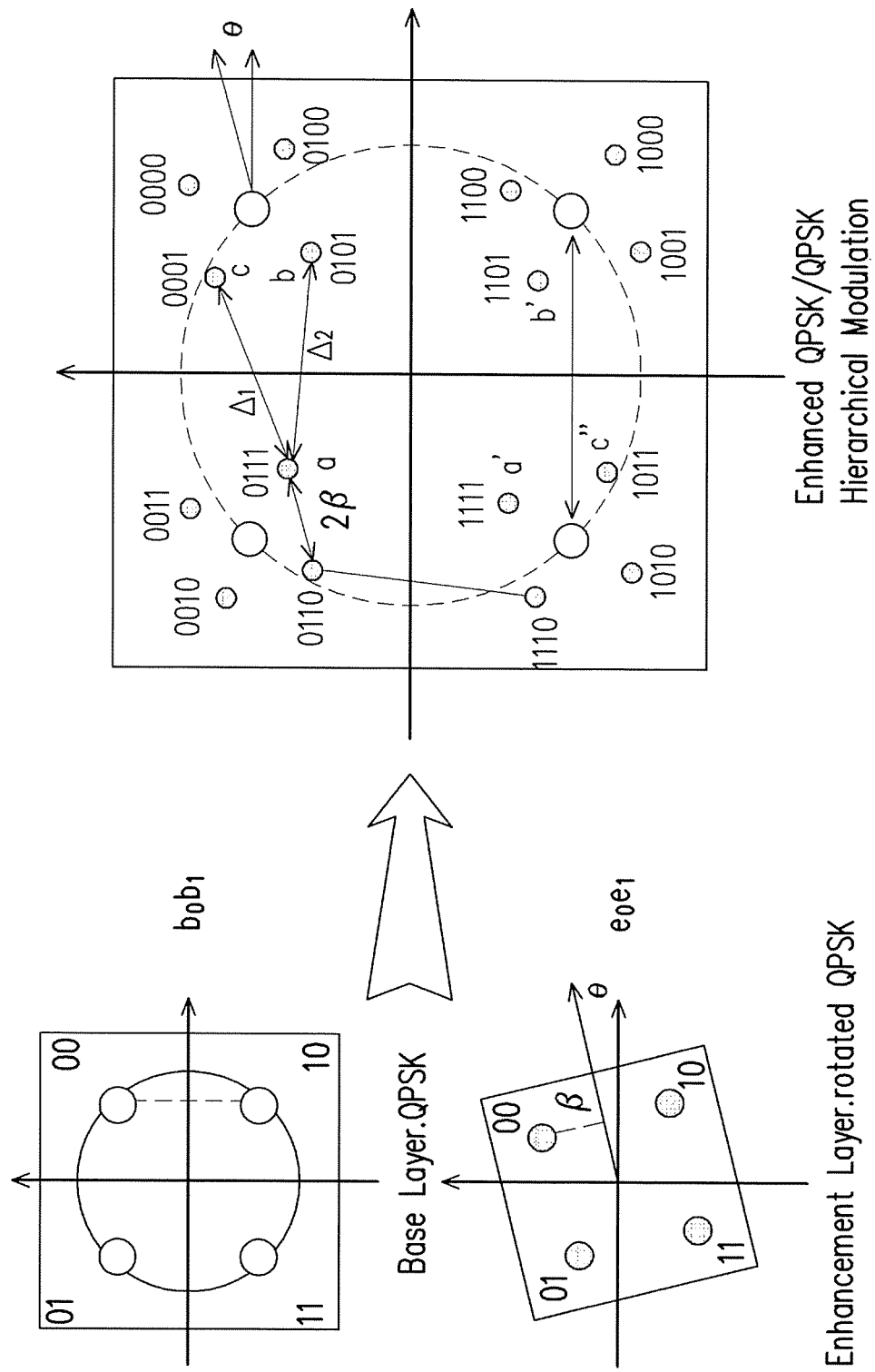
FIG. 17 illustrates rotated hierarchical modulation according to an embodiment of the disclosure.
Figure 18:
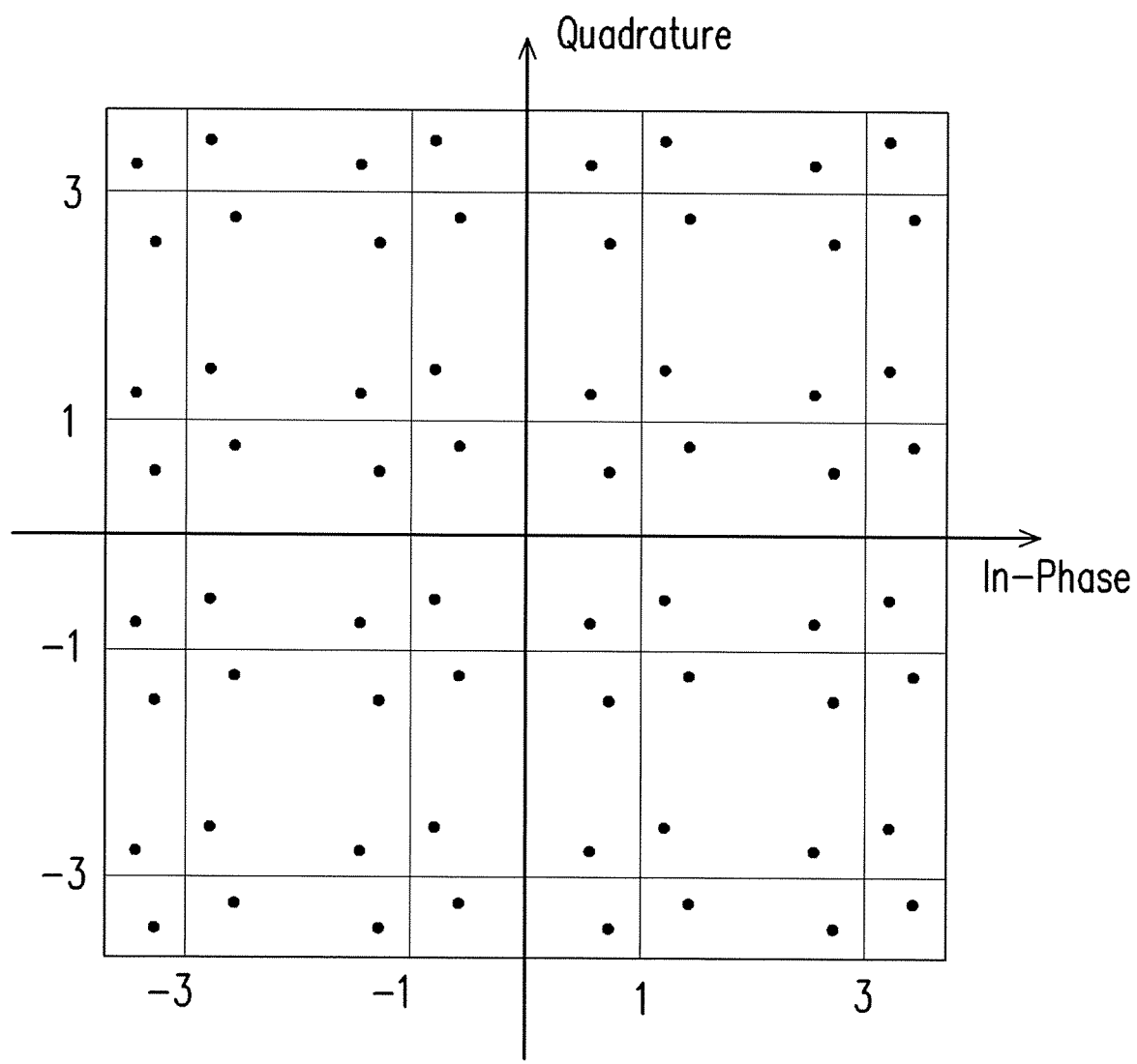
FIG. 18 illustrates rotated hierarchical modulation according to another embodiment of the disclosure.

Enhancing the hierarchical modulation reduces the effect of ILI. One way to reduce ILI is via rotation of the constellation points carrying the enhanced layer information. FIG. 17 illustrates a QAM 16 hierarchical modulation constellation with rotated constellation points allowing better discernment of the base layer using QPSK demodulation while using a modified QAM16 demodulation to discern the constellation points conveying the enhanced layer data. FIG. 18 illustrates a QAM 64 constellation with rotated constellation points which allow better point discernment when receiving a base layer using either QPSK or QAM 16 while using a modified QAM 64 demodulation to discern the constellation points conveying the enhanced layer data. Rotation increases the noise margin for the base layer stream with little increase to system complexity. Selection of the rotation angle is done via optimizing different criteria in the system performance. For example, the achievable spectral efficiency may be maximized by optimizing Euclidean distance between two higher order constellation points that resolve to different lower order constellation points in the modulation scheme used to receive the base layer.

Figure 19:
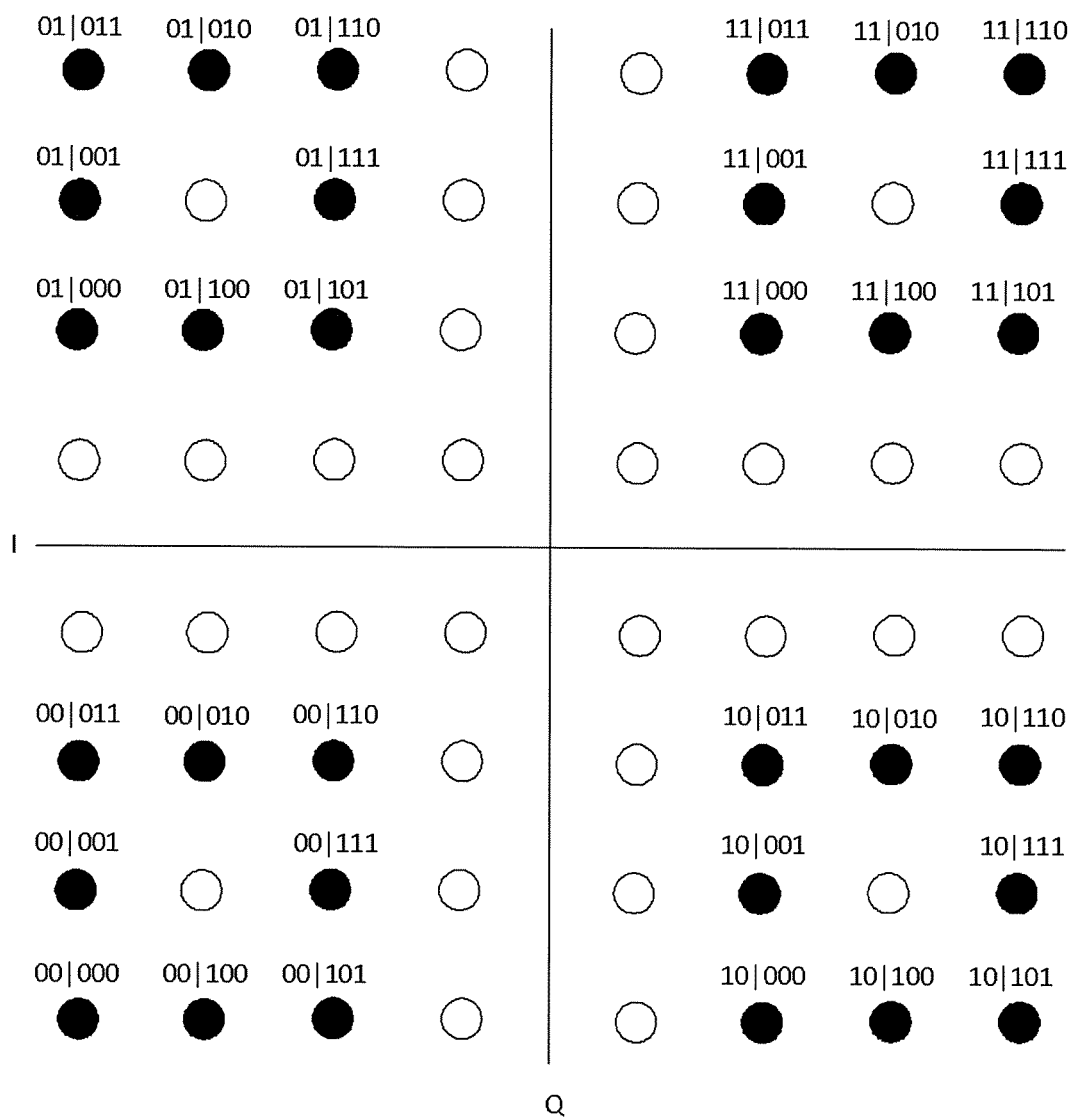
FIG. 19 illustrates a constellation diagram of hierarchical modulation muting 32 constellation points according to an embodiment of the disclosure.

Another approach for mitigating ILI is done via muting of constellation points, as illustrated in FIG. 19. Here, muting increases the noise margin as it increases the Euclidean distance between higher order constellation points that resolve to different lower order constellation points in the modulation scheme used to receive the base layer. In this example, a QPSK base layer and the logical equivalent of a QAM8 (3 bits per symbol data carrying capacity) enhanced layer are transmitted using a QAM64 constellation with 32 out of the 64 points muted, which is possible because the QAM64 constellation has 6 bits per symbol carrying capacity. Muting half the points leaves the remaining 32 symbols with 5 bits per symbol carrying capacity. This technique is sufficient for carrying the 2 bits per symbol of the QPSK base layer and the 3 bits per symbol of the logical QAM8 enhanced layer. Both the QPSK base layer and the logical QAM8 enhanced layer are encoded using Grey coding, the implementation of which is apparent to one of ordinary skill in the art. The respective binary bits of the two streams are separated by a "|" character for ease in visually identifying the bits belonging to each stream. One of ordinary skill in the art readily appreciates that different combinations or different numbers of constellation points may be muted and coding other than Grey coding may be used. For example, if only the 28 constellation points directly adjacent to the I and Q axis were muted, the enhanced layer would have 9 constellation points (i.e., 9 additional positions in each quadrant) rather than 8, giving a carrying capacity of log2(9) (approximately 3.17) bits per symbol for the enhanced layer.

Figure 20:
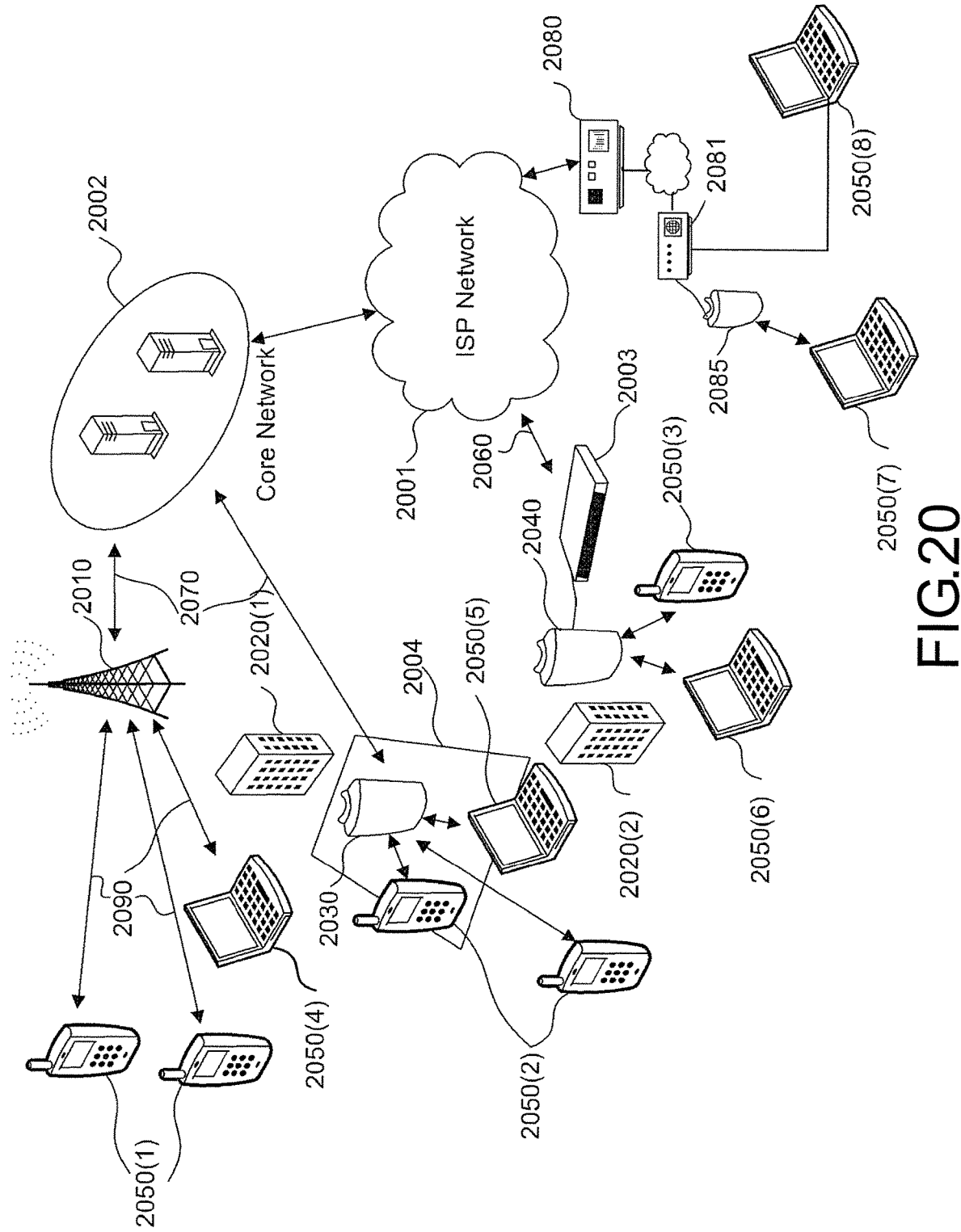
FIG. 20 illustrates network system in which with aspects of the disclosure may be implemented.

FIG. 20 is a communication network in which features disclosed herein can be implemented in accordance with aspects of the disclosure. A macro access node 2010 is connected to a core network 2002 through a backhaul connection 2070. In an embodiment, the backhaul connection 2070 is a bidirectional link or two unidirectional links. The direction from the core network 2002 to the macro access node 2010 is referred to as the downstream or downlink direction. The direction from the macro access node 2010 to the core network 2002 is referred to as the upstream or uplink direction. Subscriber stations 2050(1) and 2050(4) can connect to the core network 2002 through the macro access node 2010. Wireless links 2090 between subscriber stations 2050(1) and 2050(4) and the macro access node 2010 are bidirectional point-to-multipoint links, in an embodiment. The direction of the wireless links 2090 from the macro access node 2010 to the subscriber stations 2050(1) and 2050(4) is referred to as the downlink or downstream direction. The direction of the wireless links 2090 from the subscriber stations 2050(1) and 2050(4) to the macro access node 2010 is referred to as the uplink or upstream direction. Subscriber stations are sometimes referred to as user equipment, users, user devices, handsets, terminal nodes, or user terminals and are often mobile devices such as smart phones or tablets. The subscriber stations 2050(1) and 2050(4) access content over the wireless links 2090 using access node, such as the macro access node 2010.

In the network configuration illustrated in FIG. 20, an office building 2020(1) causes a coverage shadow 2004. A pico access node 2030 can provide coverage to subscriber stations 2050(2) and 2050(5) in the coverage shadow 2004. The pico access to node 2030 is connected to the core network 2002 via a backhaul connection 2070. The subscriber stations 2050(2) and 2050(5) may be connected to the pico access node 2030 via links that are similar to or the same as the wireless links 2090 between subscriber stations 2050(1) and 2050(4) and the macro access node 2010.

In office building 2020(2), an enterprise femtocell access node 2040 provides in-building coverage to subscriber stations 2050(3) and 2050(6). The enterprise femtocell access node 2040 can connect to the core network 2002 via an internet service provider network 2001 by utilizing a broadband connection 2060 provided by an enterprise gateway 2003.

In addition, internet service provider network 2001 may also provide a broadband connection between core network 2002 and cable head end 2080, which may be a cable head end of a local, regional or national digital cable service. Cable head end 2080 is connected to a large number of set top boxes and cable modems, such as cable modem 2081, by a network of cables or other wired connections. Cable modem 2081 may be provided in a residence or a business location and provides internet connectivity to subscriber stations 2050(7) and 2050(8). In this regard, cable modem 2081 is connected to access node 2085 which provides wireless coverage to subscriber station 2050(7) and may be, for instance, an LTE residential femtocell access node or a WiFi access node. Subscriber station 2050(8) may be directly wired to cable modem 2081 via an Ethernet connection or other wired connection.

Figure 21:
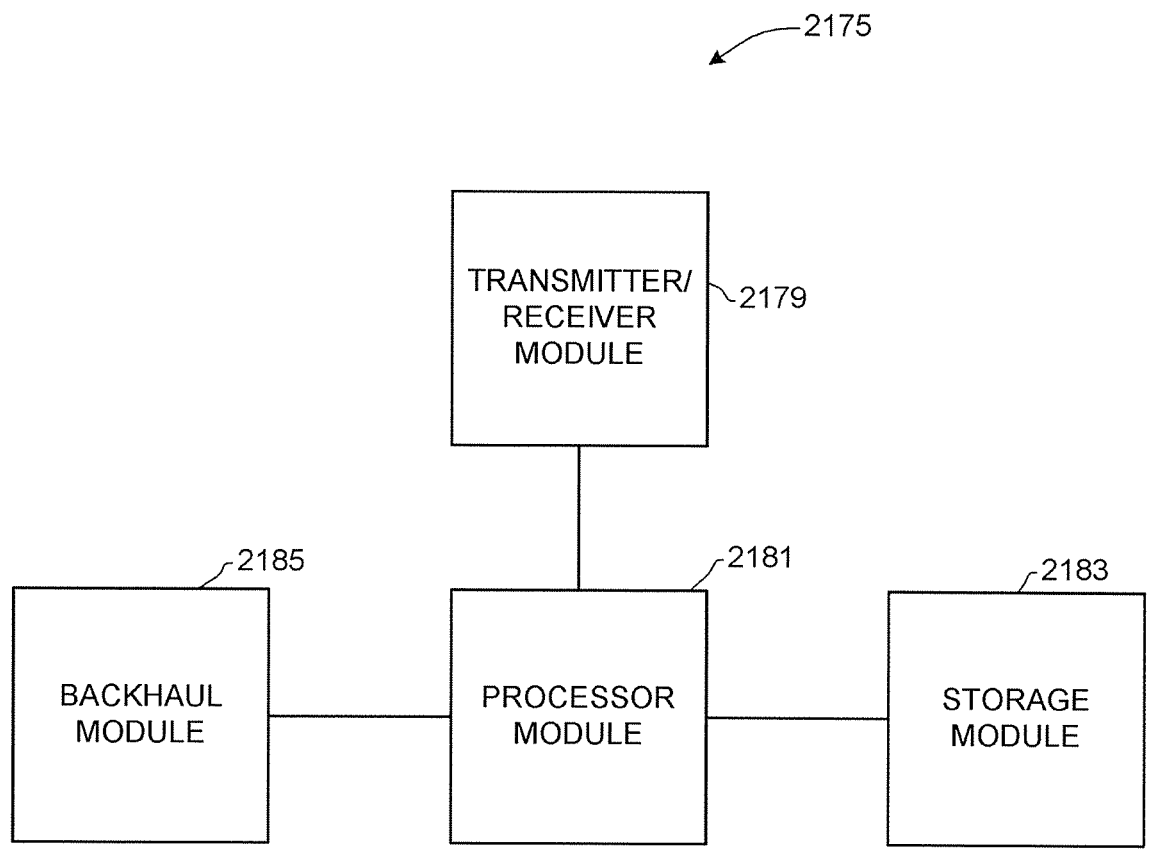
FIG. 21 illustrates an access node in accordance with aspects of the disclosure.

FIG. 21 is a functional block diagram of an access node 2175 in accordance with aspects of the disclosure. In various embodiments, the access node 2175 may be a mobile WiMAX base station (BS), a global system for mobile (GSM) wireless base transceiver station (BTS), a Universal Mobile Telecommunications System (UMTS) NodeB, an LTE evolved Node B (eNB or eNodeB), a cable modem head end, or other wireline or wireless access node of various form factors. For example, the macro access node 2010, the pico access node 2030, the enterprise femtocell access node 2040, or access node 2085 of FIG. 20 may be provided, for example, by the access node 2175 of FIG. 21.

The access node 2175 includes a processor module 2181. The processor module 2181 is coupled to a transmitter receiver (transceiver) module 2179, a backhaul interface module 2185, and a storage module 2183.

The transmitter-receiver module 2179 is configured to transmit and receive communications with other devices. In many implementations, the communications are transmitted and received wirelessly. In such implementations, the access node 2175 generally includes one or more antennae for transmission and reception of radio signals. In other implementations, the communications are transmitted and received over physical connections such as wires or optical cables. The communications of the transmitter-receiver module 2179 may be with terminal nodes.

The backhaul interface module 2185 provides communication between the access node 2175 and a core network. The communication may be over a backhaul connection, for example, the backhaul connection 2070. Communications received via the transmitter-receiver module 2179 may be transmitted, after processing, on the backhaul connection. Similarly, communication received from the backhaul connection may be transmitted by the transmitter-receiver module 2179. Although the access node 2175 of FIG. 21 is shown with a single backhaul interface module 2185, other embodiments of the access node 2175 may include multiple backhaul interface modules. Similarly, the access node 2175 may include multiple transmitter-receiver modules. The multiple backhaul interface modules and transmitter-receiver modules may operate according to different protocols.

The processor module 2181 can process communications being received and transmitted by the access node 2175. The storage module 2183 stores data for use by the processor module 2181. The storage module 2183 may also be used to store computer readable instructions for execution by the processor module 2181. The computer readable instructions can be used by the access node 2175 for accomplishing the various functions of the access node 2175. In an embodiment, the storage module 2183 or parts of the storage module 2183 may be considered a non-transitory machine readable medium. For concise explanation, the access node 2175 or aspects of it are described as having certain functionality. It will be appreciated that in some aspects, this functionality is accomplished by the processor module 2181 in conjunction with the storage module 2183, transmitter-receiver module 2179, and backhaul interface module 2185. Furthermore, in addition to executing instructions, the processor module 2181 may include specific purpose hardware to accomplish some functions.

Figure 22:
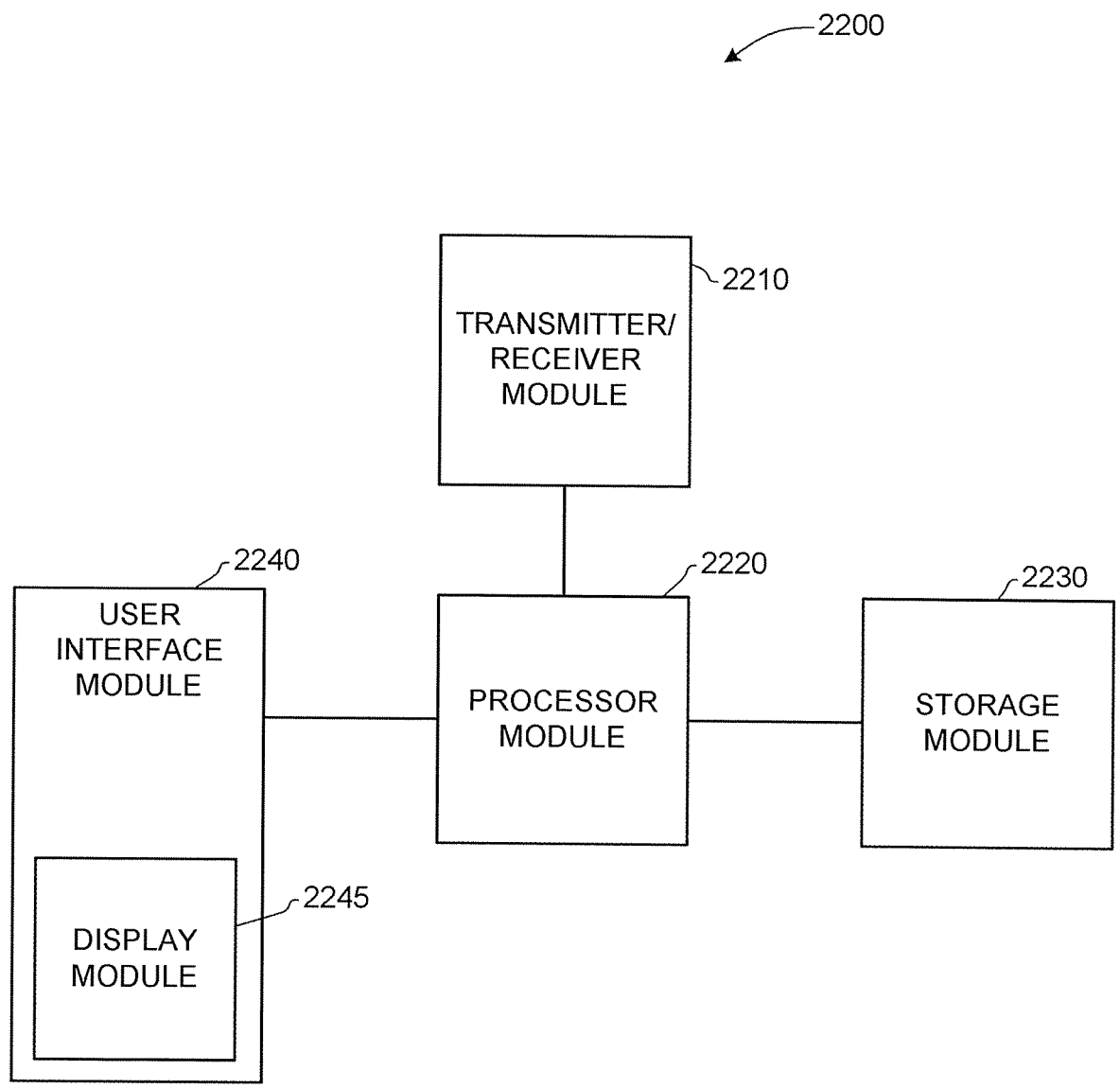
FIG. 22 illustrates a terminal node in accordance with aspects of the disclosure.

FIG. 22 is a functional block diagram of a terminal node in accordance with aspects of the disclosure. In this regard, the term "terminal node" may refer to a subscriber station (as in FIG. 20), a user equipment, a mobile phone, a cellular phone, a user device or other network node operated by a user. The terminal node 2200 can be used for viewing streaming video. In various example embodiments, the terminal node 2200 may be a mobile device, for example, a smartphone or tablet or notebook computer. The terminal node 2200 includes a processor module 2220. The processor module 2220 is communicatively coupled to transmitter-receiver module (transceiver) 2210, user interface module 2240, and storage module 2230. The processor module 2220 may be a single processor, multiple processors, or a combination of one or more processors and additional logic such as application-specific integrated circuits (ASIC) or field programmable gate arrays (FPGA).

The transmitter-receiver module 2210 is configured to transmit and receive communications with other devices. For example, the transmitter-receiver module 2210 may communicate with a cellular or broadband base station such as an LTE evolved node B (eNodeB) or WiFi access point (AP). In example embodiments where the communications are wireless, the terminal node 2200 generally includes one or more antennae for transmission and reception of radio signals. In other example embodiments, the communications may be transmitted and received over physical connections such as wires or optical cables and the transmitter/receiver module 2210 may be an Ethernet adapter or cable modem. Although the terminal node 2200 is shown with a single transmitter-receiver module 2210, other example embodiments of the terminal node 2200 may include multiple transmitter-receiver modules. The multiple transmitter-receiver modules may operate according to different protocols.

The terminal node 2200, in some example embodiments, provides data to and receives data from a person (user). Accordingly, the terminal node 2200 includes a user interface module 2240. The user interface module 2240 includes modules for communicating with a person. The user interface module 2240, in an exemplary embodiment, may include a display module 2245 for providing visual information to the user, including displaying video content. In some example embodiments, the display module 2245 may include a touch screen which may be used in place of or in combination with a keypad connected to the user interface module 2240. The touch screen may allow graphical selection of inputs in addition to alphanumeric inputs.

In an alternative example embodiment, the user interface module 2240 may include a computer interface, for example, a universal serial bus (USB) interface, to interface the terminal node 2200 to a computer. For example, a wireless modem, such as a dongle, may be connected, by a wired connection or a wireless connection, to a notebook computer via the user interface module 2240. Such a combination may be considered to be a terminal node 2200. The user interface module 2240 may have other configurations and include hardware and functionality such as speakers, microphones, vibrators, and lights.

The processor module 2220 can process communications received and transmitted by the terminal node 2200. The processor module 2220 can also process inputs from and outputs to the user interface module 2240. The storage module 2230 may store data for use by the processor module 2220, including images or metrics derived from images. The storage module 2230 may also be used to store computer readable instructions for execution by the processor module 2220. The computer readable instructions can be used by the terminal node 2200 for accomplishing the various functions of the terminal node 2200. Storage module 2230 can also store received content, such as video content that is received via transmitter/receiver module 2210.

The storage module 2230 may also be used to store photos and videos. In an example embodiment, the storage module 2230 or parts of the storage module 2230 may be considered a non-transitory machine readable medium. In an example embodiment, storage module 2230 may include a subscriber identity module (SIM) or machine identity module (MIM).

For concise explanation, the terminal node 2200 or example embodiments of it are described as having certain functionality. It will be appreciated that in some example embodiments, this functionality is accomplished by the processor module 2220 in conjunction with the storage module 2230, the transmitter-receiver module 2210 and the user interface module 2240. Furthermore, in addition to executing instructions, the processor module 2220 may include specific purpose hardware to accomplish some functions.

The foregoing described aspects and features are susceptible to many variations. Additionally, for clarity and concision, many descriptions of the aspects and features have been simplified. For example, the figures generally illustrate one of each type of device (e.g., one access node, one terminal node), but a communication system may have many of each type of device. Similarly, many descriptions use terminology and structures of a specific wireless standard such as LTE, WiMAX, GSM, and the like. However, the disclosed aspects and features are more broadly applicable, including for example, other types of communication systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The various illustrative logical blocks, units, steps and modules described in connection with the embodiments disclosed herein, and those provided in the accompanying documents, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, and those provided in the accompanying documents. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein, and those provided in the accompanying documents, can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices (for instance, a relay) that couple the first and second device and also when the first device is unaware of the ultimate destination of the data.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent particular aspects and embodiments of the disclosure and are therefore representative examples of the subject matter that is broadly contemplated by the present disclosure. It is further understood that the scope of the present disclosure fully encompasses other embodiments that are, or may become, obvious to those skilled in the art and that the scope of the present disclosure is accordingly not limited by the descriptions presented herein.

What is claimed is:

1. A method for hierarchical modulation of two data streams transmitted from a user device in a communication network, the method comprising:
    identifying a plurality of data streams as candidates for hierarchical modulation;
    determining each of the data streams as a base layer data stream candidate, an enhanced layer data stream candidate, or both the base layer data stream candidate and the enhanced layer data stream candidate;
    adding each of the data streams into either a first candidate list as the base layer data stream candidate or a second candidate list as the enhanced layer data steam candidate or both the first candidate list and the second candidate list, wherein the first candidate list comprises a data stream modulated under a least robust modulation and a data stream modulated under an intermediate modulation and the second candidate list comprises a data stream modulated under the intermediate modulation and a most robust modulation;
    sending, via a transceiver in the user device, a request for uplink bandwidth to an access node in the communication network;
    receiving, via the transceiver, an uplink bandwidth allocation provided in a downlink channel from the access node;
    multiplexing, at the user device, a base layer data stream and an enhanced layer data stream into a first single multiplexed data stream by selecting a data stream from the first candidate list for the base layer data stream and by selecting a data stream from the second candidate list for the enhanced layer data stream; and
    transmitting, via the transceiver, the single multiplexed data stream to the access node in the uplink bandwidth allocation.

2. The method of claim 1, wherein the request for uplink bandwidth indicates the use of hierarchical modulation by the user device.

3. The method of claim 1, wherein identifying candidate data streams as candidates for hierarchical modulation comprising:
    receiving identifications for identifying candidate data streams as candidates for hierarchical modulation from an access node.

4. The method of claim 1, wherein identifying candidate data streams as candidates for hierarchical modulation comprising:
 identifying, locally, candidate data streams as candidates for hierarchical modulation from an access node.

5. The method of claim 1, wherein the enhanced layer data stream has more bits per symbol than the base layer data stream.

6. A user equipment (UE) comprising:
 a transceiver; and
 a processor coupled to the transceiver and configured at least for:
  identifying a plurality of data streams as candidates for hierarchical modulation;
  determining each of the data streams as a base layer data stream candidate, an enhanced layer data stream candidate, or both the base layer data stream candidate and the enhanced layer data stream candidate;
  adding each of the data streams into either a first candidate list as the base layer data stream candidate or a second candidate list as the enhanced layer data steam candidate or both the first candidate list and the second candidate list, wherein the first candidate list comprises a data stream modulated under a least robust modulation and a data stream modulated under an intermediate modulation and the second candidate list comprises a data stream modulated under the intermediate modulation and a most robust modulation;
  sending, via the transceiver, a request for uplink bandwidth to an access node in the communication network;
  receiving, via the transceiver, an uplink bandwidth allocation provided in a downlink channel from the access node;
  multiplexing, a base layer data stream and an enhanced layer data stream into a single multiplexed data stream; and
  transmitting, via the transceiver, the single multiplexed data stream to the access node in the uplink bandwidth allocation by selecting a data stream from the first candidate list for the base layer data stream and by selecting a data stream from the second candidate list for the enhanced layer data stream.

7. The device of claim 6, wherein the request for uplink bandwidth indicates the use of hierarchical modulation by the UE.

8. The device of claim 6, wherein identifying candidate data streams as candidates for hierarchical modulation comprising:
 receiving, via the transceiver, identifications for identifying candidate data streams as candidates for hierarchical modulation from an access node.

9. The device of claim 6, wherein identifying candidate data streams as candidates for hierarchical modulation comprising:
 identifying, locally, candidate data streams as candidates for hierarchical modulation from an access node.

10. The device of claim 6, wherein the enhanced layer data stream has more bits per symbol than the base layer data stream.

\* \* \* \* \*